United States Patent [19]
Mifune et al.

[11] Patent Number: 5,555,905
[45] Date of Patent: Sep. 17, 1996

[54] CASSETTE TYPE GAS CYLINDER WITH REMAINING VOLUME ALARM UNIT AND MANUFACTURING METHOD THEREOF

[75] Inventors: Hideo Mifune; Yasuaki Nakamura, both of Shizuoka-ken, Japan

[73] Assignee: Tokai Corporation, Shizuoka-ken, Japan

[21] Appl. No.: 244,086

[22] PCT Filed: Sep. 14, 1993

[86] PCT No.: PCT/JP93/01311

§ 371 Date: May 16, 1994

§ 102(e) Date: May 16, 1994

[87] PCT Pub. No.: WO94/07083

PCT Pub. Date: Mar. 31, 1994

[30] Foreign Application Priority Data

Sep. 16, 1992 [JP] Japan ................... 4-246560
Dec. 25, 1992 [JP] Japan ................... 4-346018
Jan. 11, 1993 [JP] Japan ................... 5-002455
May 7, 1993 [JP] Japan ................... 5-106700

[51] Int. Cl.$^6$ ........................................ G01F 23/00
[52] U.S. Cl. .................. 137/15; 137/557; 116/70; 116/109; 116/227
[58] Field of Search ............. 116/70, 109, 227; 137/557, 15

[56] References Cited

U.S. PATENT DOCUMENTS

| | | | |
|---|---|---|---|
| 2,118,311 | 5/1938 | Kinderman | 137/214 |
| 3,024,760 | 3/1962 | Enrico | 116/109 |
| 3,397,577 | 8/1968 | Siebert | 73/309 |
| 3,640,241 | 2/1972 | Adaglio | 116/109 |

FOREIGN PATENT DOCUMENTS 0167409 1/1986 European Pat. Off. .
1338864 10/1965 France .
2247712 5/1975 France .

OTHER PUBLICATIONS

EPO International Search Report dated Jan. 13, 1994 in International Application No. PCT/JP93/01311.

*Primary Examiner*—A. Michael Chambers
*Attorney, Agent, or Firm*—Brumbaugh, Graves Donohue & Raymond

[57] ABSTRACT

A cassette type gas cylinder, containing liquefied fuel gas, for giving an alarm when the volume of remaining fuel is reduced to a predetermined level or less in order to provide an advanced notice of replacement of the gas cylinder with a simple structure using burst energy of discharged gas. A valve 12 for opening and closing the discharge of liquefied gas is arranged at the center on one end of a container body 11a. A gas flow channel 17, with one end thereof opened into a gas space formed above the level of the fuel when the gas cylinder is laid horizontally, is connected to the valve 12. A vibrating member 27, for producing a sound when vibrated and caused to collide with a body by the burst of the fuel gas, is disposed in the gas flow channel 17. This vibrating member 27 is connected to a damping member 38 by means of a coupling member 29. The damping member 38 is located below a predetermined level of the liquefied fuel gas, and is subjected to resistance while moving in the liquefied fuel gas. The damping member 38 suppresses the production of a collision sound made by the vibrating member 27 by providing the vibrating member 27 with resistance when the level of the liquefied fuel is above the predetermined level, but does not suppress the production of the collision sound when the level of the liquefied fuel is below the predetermined level, thereby giving an alarm indicating the reduction of remaining fuel.

31 Claims, 24 Drawing Sheets

FIG. 7
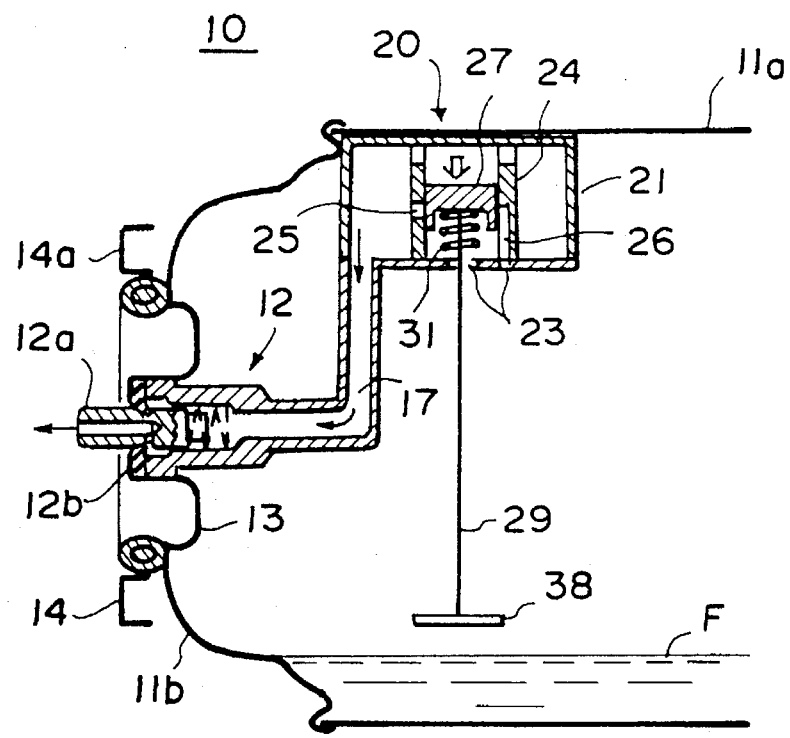
FIG. 8A  FIG. 8B  FIG. 8C
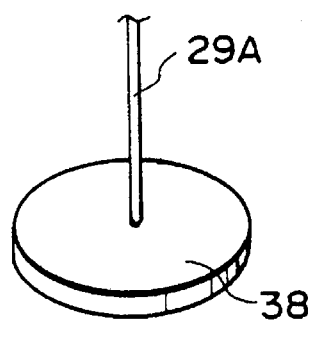 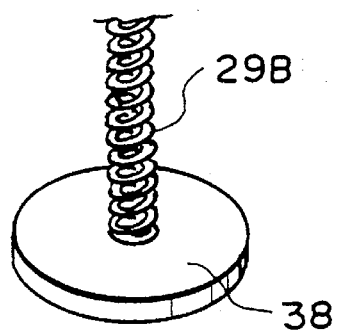 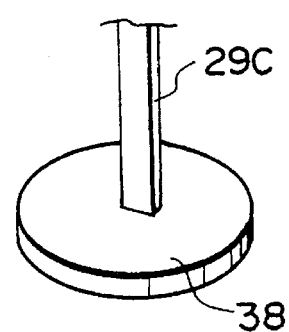

5,555,905

CASSETTE TYPE GAS CYLINDER WITH REMAINING VOLUME ALARM UNIT AND MANUFACTURING METHOD THEREOF

BACKGROUND OF THE INVENTION

1. Field of the Invention

This invention relates to a cassette type gas cylinder containing liquefied fuel gas and a manufacturing method thereof and, more particularly, a structure which enables an alarm for the volume of remaining gas to be given.

2. Description of the Prior Art

Portable heaters are heretofore widely known wherein combustion is effected by gas supplied from a cassette gas cylinder set into a portable heater containing liquefied fuel gas instead of gas supplied through a gas hose connected to a gas outlet of town gas. This cassette type gas cylinder is used with portable heaters and stoves for outdoor activity purposes or with other types of gas apparatuses.

The above-mentioned cassette type gas cylinder is provided with a cylindrical container body, and a valve for opening and closing the discharge of liquefied gas contained in the container. This container is set into a gas apparatus while being laid. A nick-shaped indentation which engages with a corresponding protuberance of the gas apparatus is formed on the end of the container so that a definite position of the container can be directed to the upper side. A gas flow guide channel extends from the inner end of the valve into an upper space inside the container body defined when the container is positioned horizontally, and the upper end of the channel is open in the upper space. This ensures that vaporized gas is constantly given off from a gas space, which in turn prevents the supply of liquefied fuel as it is.

However, in the case of the gas cylinder of the above-mentioned type, it is difficult to know the volume of remaining gas from the outside when the amount of liquefied fuel gas contained is reduced as a result of its use. Also, a gas spray velocity tends to drop sharply, and hence there is a fear of unforeseeable consumption of fuel which causes the gas to be extinguished.

In other words, the volume of the remaining fuel of the cassette gas cylinder can be definitely ascertained by removably swinging the container away from the gas apparatus. Accordingly, an opportunity for replacing the gas cylinder with a new one is difficult to realize while the gas cylinder is set in the gas apparatus, and the fuel may come to an end without the preparation of a spare gas cylinder. Hence, there is a demand for an alarm which is sounded when the volume of the remaining fuel is reduced to a nominal amount.

When the reduction of the remaining fuel is informed by sounding an alarm, there arises a problem that such an alarm is not clearly noticed because sound produced inside a sealed container tends not to travel very well to the outside. The use of a battery for providing an alarm built into the gas cylinder adds to the cost of the gas cylinder, and such an alarm may be erroneously sounded while the gas cylinder is being transferred.

Further, when a remaining volume alarm unit is disposed inside a cassette type gas cylinder, it is necessary to arrange a compact remaining volume alarm unit in an limited internal space of the cylinder, and to ensure a superior assembly property of the gas cylinder.

Moreover, the container of the cassette gas cylinder is constituted by: joining a circular top to the edge of a circular container body; connecting a lid to which a valve is fixed to the center aperture of this top, so that the top is built up; and filling the container with liquefied gas. When a remaining volume alarm unit is built into the cylinder, the remaining volume alarm unit integrated with the valve of the lid must be inserted into the aperture of the top. This narrow aperture makes it difficult to insert the alarm unit, which in turn causes the mounting characteristic of the alarm unit to be deteriorated, thereby leading to a drop in productivity.

SUMMARY OF THE INVENTION

In view of the foregoing observations and descriptions, the first object of this invention is to provide a cassette type gas cylinder equipped with a remaining volume alarm unit which gives a discernible alarm when the volume of the remaining fuel reaches a predetermined level or less.

The second object of this invention is to provide a cassette type gas cylinder which possesses a superior assembly property, and which is equipped with a remaining volume alarm unit which gives a discernible alarm when the volume of the remaining fuel reaches a predetermined level or less.

The third object of this invention is to provide a cassette type gas cylinder provided with a remaining volume alarm unit which gives an alarm when a remaining volume is reduced to a predetermined level or less, and possessing a superior mounting characteristic of the remaining alarm unit.

To these ends, according to a first aspect of this invention, the present invention provides a cassette type gas cylinder comprising:

a container for containing liquefied fuel gas;

a valve means positioned on one end of the container for controlling the discharge of the fuel;

a gas flow channel means with one end thereof connected to the inner end of the valve means and with the other end thereof opened into a gas space formed above the level of the fuel when the gas cylinder is laid horizontally;

a movable vibrating member disposed in the gas flow channel means for producing a sound when vibrated and caused to collide with a body by the burst of the fuel gas; and a damping means connected to the vibrating member by means of a coupling member, and located below a predetermined level of the liquefied fuel gas, whereby the damping means suppresses the production of a collision sound made by the vibrating member by providing the vibrating member with resistance when the level of the liquefied fuel is above the predetermined level, but does not suppress the production of the collision sound when the level of the liquefied fuel is below the predetermined level.

In a preferred mode, the cassette type gas cylinder mentioned above further comprises:

a casing connected to the gas flow channel means; and a cylinder having a connecting hole arranged inside the casing, in which the vibrating member is slidably fitted in the cylinder with one end surface of the vibrating member being subjected to an internal gas pressure of the container;

the connecting hole formed so as to be closed by the vibrating member when the vibrating member is situated at a descended position, whereby the movement of the vibrating member is brought about by the increase of a difference between pressures acting on both sides of the vibrating member when the connecting hole is closed in response to a pressure drop occurring in the gas flow channel means resulting from the opening of the valve, and the speed of movement of the vibrating member depends on the position of the damping means with respect to the predetermined level. The vibrating member may be in the form of a piston.

In a preferred mode, the cassette type gas cylinder further comprises:

a resilient member for supporting the weight of the vibrating member when the gas flow channel means is disconnected from an internal space of the cylinder by the vibrating member; and a port which opens when the vibrating member is moved displacing the resilient member, then the gas flow channel means is connected with the internal space of the cylinder. In practice, the resilient member is made up of a coil spring sandwiched between the vibrating member and a bottom of the casing, and the coupling member should be made from a flexible material.

According to a second aspect of this invention, the present invention provides a cassette type gas cylinder comprising:

a container for containing liquefied fuel gas;

a valve means positioned on one end of the container for controlling the emission of the fuel;

a gas flow channel means extended from one end thereof, connected to the inner end of the valve means, to the other end thereof opened into a gas space formed above the level of the fuel when the gas cylinder is laid horizontally;

a movable vibrating member disposed in the gas flow channel means for producing a sound when vibrated and caused to collide with a body by the burst of the fuel gas;

a link mechanism connected to the vibrating member by means of a coupling member, and made up of the coupling member and a floating member; and the floating member which moves in accordance with the volume of liquefied fuel remaining in the container and located below a predetermined level of the liquefied fuel gas, whereby the floating means suppresses the production of a collision sound made by the vibrating member by providing the vibrating member with resistance when the level of the liquefied fuel is above the predetermined level, but does not suppress the production of the collision sound when the level of the liquefied fuel is below the predetermined level.

In the foregoing cassette type gas cylinder, when the volume of fuel contained in the container is larger than a predetermined amount, the level of the fuel is high, and hence the damping member comes into contact with a large volume of liquefied fuel while moving in the liquefied fuel. This prevents the vibrating member from colliding with the wall of the container. The vibrating member is also prevented from colliding with the wall of the container by the rising of the floating member corresponding to the level of the liquefied fuel by way of the link mechanism. Accordingly, when contained gas is discharged from the valve via the gas flow channel, the vibrating member will not produce a collision sound as a result of the emission of gas. To the contrary, when the volume of fuel remaining in the container is reduced to the predetermined amount or less, the damping member is not subjected to resistance of the liquefied fuel, and hence the vibrating member is rendered free to move and so collides with the wall of the container. Also, the lowering of the floating member causes the vibrating member to be free to move and to collide with the wall of the container. Hence, the vibrating member collides with the wall of the container or a sounding body in response to gas emitted from the gas flow channel, thereby producing a collision sound. This collision sound raises an alarm definitely noticeable from the outside which indicates the reduction of the remaining fuel, whereby it becomes possible to prevent unforeseeable consumption of fuel.

In the cassette type gas cylinder provided with the resilient member and the port, while the cylinder is filled with gas or the gas flow channel is disconnected from the internal space of the cylinder, when the pressure inside the gas flow channel is increased, the port is opened deforming the resilient member so that high pressure gas inside the gas flow channel can enter the internal space of the gas cylinder, thereby preventing the escape of high pressure gas to the outside.

In the cassette type gas cylinder with the resilient member sandwiched between the vibrating member and the casing, when the coupling member is made of a flexible material, it becomes possible to insert the remaining volume alarm unit into a body of the gas cylinder with the damping member displaced and the coupling member deformed, whereby the mounting characteristic of the gas cylinder is improved.

According to a third aspect of this invention, the present invention provides a cassette type gas cylinder comprising:

a container, for containing liquefied fuel gas, which is made up of a cylindrical container body, a annular top to be joined to one end of the container body and a lid to be joined to the center aperture of the top;

a valve fixed to the center of the lid for controlling the discharge of the liquefied fuel gas;

a gas flow channel with one end thereof fittedly insertable into the inner end of the valve in the axial direction and with the other end thereof extended upward into a gas space formed above the fuel level of the container body laid horizontally;

a casing connected to the end of the gas flow channel for housing a remaining volume alarm unit which gives an alarm when the volume of remaining liquefied fuel is reduced to a predetermined level or less, and the outer surface of the casing being shaped into a ring so that it can be fitted to the inner surface of the container body and also joined to a radially extended supporting member; and the supporting member for fixedly placing the casing to which the gas flow channel is firmly attached in position inside the container body, wherein the inner end of the valve is fitted to the end of the gas flow channel after the container body is joined to the top but before the lid is attached to the top.

According to a fourth aspect of this invention, the present invention provides a cassette type gas cylinder comprising:

a container, for containing liquefied fuel gas, which is made up of a cylindrical container body, a annular top to be joined to one end of the container body and a lid to be joined to the center aperture of the top;

a valve fixed to the center of the lid for controlling the discharge of the liquefied fuel gas;

a gas flow channel with one end thereof insertably fitted into the inner end of the valve in the axial direction and with the other end thereof extended upward into a gas space formed above the fuel level of the container body laid horizontally;

a casing connected to the end of the gas flow channel for housing a remaining volume alarm unit which gives an alarm when the volume of the remaining fuel is reduced to a predetermined level or less, and produced in the form of an expanded chamber with one side surface thereof fitted with the inner surface of the top and with the outside surface thereof joined to the top; and the expanded chamber which fixedly attaches the casing, to which the gas flow channel is connected, to the inner surface of the top, and the inner end of the valve being fitted to the end of the gas flow channel when the lid is attached to the top after the top is joined to the container body.

In a preferred mode, the remaining volume alarm unit should be provided with a movable vibrating member for producing a collision sound when it is vibrated and caused to collide with a body by the burst of gas; and a damping means connected to the vibrating member by means of a coupling member, and located below the predetermined level of the liquefied fuel gas, whereby the damping means suppresses the production of a collision sound made by the vibrating member by providing the vibrating member with resistance when the level of the liquefied fuel is above the predetermined level, but does not suppress the production of the collision sound when the level of the liquefied fuel is below the predetermined level.

In the cassette type gas cylinder as mentioned above, when the volume of the remaining fuel is reduced to a predetermined amount or less, this volume is detected because of the reduction of resistance to which the damping member is subjected while moving in the liquefied fuel. When the vibrating member moves together with the emission of contained gas, it collides with the wall of the container, thereby producing a sound. This collision sound gives an alarm noticeable from the outside which indicates the reduction of the remaining fuel. Thus, it becomes possible to prevent unforeseeable consumption of fuel.

According to a fifth aspect of this invention, the present invention provides a method for manufacturing a cassette type gas cylinder provided with a container for containing liquefied fuel gas, which is made up of a cylindrical container body, a annular top to be joined to one end of the container body and a lid to be joined to the center aperture of the top, and a valve fixed to the center of the lid for controlling the discharge of the liquefied fuel gas, the method comprising the steps of:

disposing a gas flow channel with one end thereof insertably fitted into the inner end of the valve in the axial direction and with the other end thereof extended upward into a gas space formed above the fuel level of the container body laid horizontally;

disposing a casing which is connected to the end of the gas flow channel for housing a remaining volume alarm unit which gives an alarm when the volume of remaining liquefied fuel is reduced to a predetermined level or less, with the outer surface of the casing being shaped into a ring so that it can fit to the inner surface of the container body and also joined to a radially extended supporting member;

inserting the casing to which the gas flow channel is fixed into the container body;

fixedly putting the casing in position inside the container body with the supporting member; and assembling the gas cylinder by fitting the end of the valve with the end of the gas flow channel when the lid is attached to the top after the container body and the top are joined together.

According to a sixth aspect of this invention, the present invention provides a method for manufacturing a cassette type gas cylinder provided with a container for containing liquefied fuel gas, which is made up of a cylindrical container body, a annular top to be joined to one end of the container body and a lid to be joined to the center aperture of the top, and a valve fixed to the center of the lid for controlling the discharge of the liquefied fuel gas, the method comprising the steps of:

disposing a gas flow channel with one end thereof insertably fitted into the inner end of the valve in the axial direction and with the other end thereof extended upward into a gas space formed above the fuel level of the container body laid horizontally;

disposing a casing which is connected to the end of the gas flow channel for housing a remaining volume alarm unit which gives an alarm when the volume of the remaining fuel is reduced to a predetermined level or less, and which is produced in the form of an expanded chamber with one side surface thereof fitted along the inner surface of the top and with the outside surface thereof joined to the top;

fixing the casing to which the gas flow channel is connected to the inner surface of the top; and assembling the gas cylinder by fitting the end of the valve to the end of the gas flow channel when the lid is attached to the top after the top and the container body are joined together.

In the foregoing methods, a cassette type gas cylinder is manufactured by the steps of: fixing the casing incorporating the remaining volume alarm unit to either the container body of the container or the top; joining the container body and the top together; and fitting the end of the valve to the end of the gas flow channel attached to the casing when the lid to which the valve is fixed is fittedly inserted into the top. Thereby, the lid can be easily attached to the top, and hence the attachment of the lid to the top can be carried out by machines, whereby the cost of the gas cylinder can be reduced due to mass production of the gas cylinders.

According to a seventh embodiment of this invention, the present invention provides a cassette gas cylinder comprising:

a cylindrical container body for containing liquefied fuel;

a lid for sealing an open end of the cylindrical container body;

a valve fixedly attached to the center of the lid for controlling the discharge of the liquefied fuel;

a housing, having a built-in remaining volume alarm unit, with one end thereof formed into a gas chamber which is connected with a gas space above the fuel level of the container body when the cylinder is laid horizontally, and also having a gas flow channel with one end thereof insertably fitted into the inner end of the valve in the axial direction and with the other end thereof connected to the gas chamber;

a cylinder section formed inside the gas chamber which vertically extends when the cylinder is laid horizontally;

a hammer means housed in the cylinder section for producing a collision sound when moved by the burst of gas contained in the container body, and the upper surface of the hammer means being subjected to a pressure of the gas chamber and the lower surface of the hammer means being subjected to an internal pressure of the container body;

a resilient member interposed between the bottom surface of the hammer and the cylinder;

an inflow passage formed along the cylinder for connecting the gas chamber with the container body when the hammer is lowered compressing the resilient member by a given amount;

an outflow channel formed along the cylinder for connecting the gas chamber with the container body when the hammer is elevated by a given amount or more;

a coupling member with one end thereof fixed to the bottom of the hammer and with the other end thereof extended downwardly along a guide section which vertically stretches from the bottom of the gas chamber and attached to a piston-shaped damping body;

the piston-shaped damping body movable with the hammer for detecting the level of fuel fixedly attached to the lower end of the coupling member, and located below a predetermined level of the liquefied fuel gas; and the guide section enabling the inflow of liquefied fuel gas contained in the container, and a part of the guide section along which the damping body slides having a diameter slightly larger than the outer diameter of the damping body, whereby the damping means suppresses the production of a collision sound made by the vibrating member by providing the vibrating member with resistance when the level of the liquefied fuel is above the predetermined level, but does not suppress the production of the collision sound when the level of the liquefied fuel is below the predetermined level.

In the above-mentioned cassette type gas cylinder, when the volume of fuel contained in the container is larger than a predetermined amount, the level of the fuel is high, and the liquefied fuel enters the guide member. Hence the damping member is subjected to resistance of the liquefied fuel while moving in it. This prevents the hammer from colliding with the wall of the container. Even when contained gas is discharged from the valve via the gas flow channel, the discharge of gas will not cause the hammer to collide with the wall of the container body. Therefore, no collision sound is produced. To the contrary, when the volume of fuel remaining in the container is reduced to the predetermined amount or less, the damping member is not subjected to resistance of the liquefied fuel since the liquefied fuel does not enter the guide section. Accordingly, the hammer is rendered free to move, and collides with the wall of the container. Thus, the hammer collides with the wall of the container or a sounding body in response to the emission of gas from the gas flow channel, thereby producing a collision sound. This collision sound raises an alarm definitely noticeable from the outside which indicates the reduction of the remaining fuel, whereby it becomes possible to prevent unforeseeable consumption of fuel.

Moreover, when a pressure inside the gas chamber is increased, the inflow passage is opened deforming the resilient member, so that high pressure inside the gas chamber enters the internal space of the gas cylinder. This prevents gas from escaping to the outside, and also prevents the gas chamber from interrupting the filling of the gas cylinder with fuel gas.

According to an eighth aspect of this invention, the present invention provides a remaining volume alarm unit for use with a cassette type gas cylinder containing liquefied fuel gas, the alarm unit comprising:

a gas flow channel means with one end thereof connected to the inner end of a valve of the cylinder and with the other end thereof opened into a gas space formed above the level of the fuel when the gas cylinder is laid horizontally;

a movable vibrating member disposed in the gas flow channel means for producing a sound when vibrated and caused to collide with a body by the burst of the fuel gas; and a damping means connected to the vibrating member by means of a coupling member, and located below a predetermined level of the liquefied fuel gas, whereby the damping means suppresses the production of a collision sound made by the vibrating member by providing the vibrating member with resistance when the level of the liquefied fuel is above the predetermined level, but does not suppress the production of the collision sound when the level of the liquefied fuel is below the predetermined level.

In a preferred mode, the cassette type gas cylinder also comprises a casing connected to the gas flow channel means; and a cylinder having a connecting hole arranged inside the casing, in which the vibrating member is slidably fitted in the cylinder with one end surface of the vibrating member being subjected to an internal gas pressure of the container;

the connecting hole formed so as to be closed by the vibrating member when the vibrating member is situated at a descended position, whereby the movement of the vibrating member is brought about by the increase of a difference between pressures acting on both sides of the vibrating member when the connecting hole is closed in response to a pressure drop occurring in the gas flow channel means resulting from the opening of the valve, and the speed of movement of the vibrating member depends on the position of the damping means with respect to the predetermined level.

In a preferred mode, the vibrating means is in the form of a piston.

In another preferred mode, the gas cylinder further comprises:

a resilient member for supporting the weight of the vibrating member when the gas flow channel means is disconnected from an internal space of the cylinder by the vibrating member; and a port which opens when the vibrating member is moved displacing the resilient member, then the gas flow channel means is connected with the internal space of the cylinder.

BRIEF DESCRIPTION OF THE DRAWINGS

FIG. 7 is a cross sectional view showing chief elements of the cassette type gas cylinder shown in FIG. 1, and also mechanical interaction of parts involved in the sounding of an alarm;

FIGS. 8A to 8C are perspective views showing modified various examples of a coupling member shown in FIG. 1;

DETAILED DESCRIPTION OF THE EMBODIMENTS

Referring to the accompanying drawings, preferred embodiments of this invention will now be described in detail.

Figure 1:
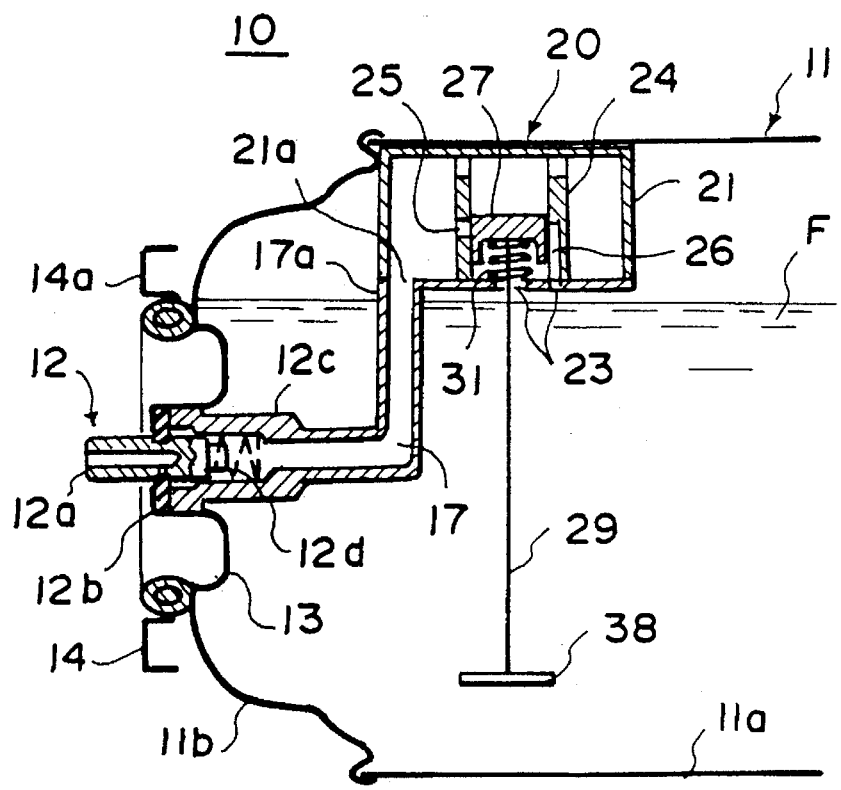
FIG. 1 is a cross sectional view showing chief elements of a cassette type gas cylinder according to a first embodiment of this invention.

First Embodiment:

FIG. 1 is a cross sectional view showing a cassette type gas cylinder according to a first embodiment. A gas cylinder 10 includes a container 11 for containing liquefied fuel gas, and the container 11 is also made up of a cylindrical container body 11a, an annular top 11b formed on one end of the container body, and a lid 13 (a mounting cup) for closing the center of the top 11b. A valve 12 for opening and closing the discharge of liquefied gas contained in the container 11 is attached to the center of the lid 13.

This valve 12 has a conventionally known structure, in which a stem 12a is movably arranged in a fixed housing 12c by way of a valve seat 12b. The stem 12a is forced in a direction of projection by means of a spring 12d, and an internal aperture connected with a nozzle is closed by the rubber valve seat 12b. When the stem 12a is forced, the valve 12 is opened, whereby evaporated gas is discharged. The lid 13 is also connected to a radially extended flange 14, and a nick-shaped indentation 14a is formed on one part of the flange 14 (on an upper part of the flange shown in FIG. 1).

A gas flow guide channel 17, connected with the valve 12 for introducing evaporated gas contained in the container body 11a, is connected to the inner end of the housing 12c of the valve 12. The gas flow guide channel 17 is axially extended to the center of the container body 11a from the housing 12c of the valve 12, and is also bent in the same direction as the nicked indentation 14a of the flange 14 is formed. A tip end section 17a is connected to an outflow port 21a of a casing 21 of a remaining volume alarm unit 20.

When the gas cylinder 10 is used, it is laid horizontally with the indentation 14a directed to the upper side. In this state, holes 23 of the case 21 connected to an internal cylinder space of the container body 11 are opened in a gas space above the level of liquefied fuel F. When the valve 12 is opened, evaporated gas is discharged along the gas flow guide channel 17 via the remaining volume alarm unit 20. This gas flow guide channel 17 is produced from plastic, and may be integrated with either the housing 12c of the valve 12 or the casing 21, or alternatively it may be separately formed.

Figure 2:
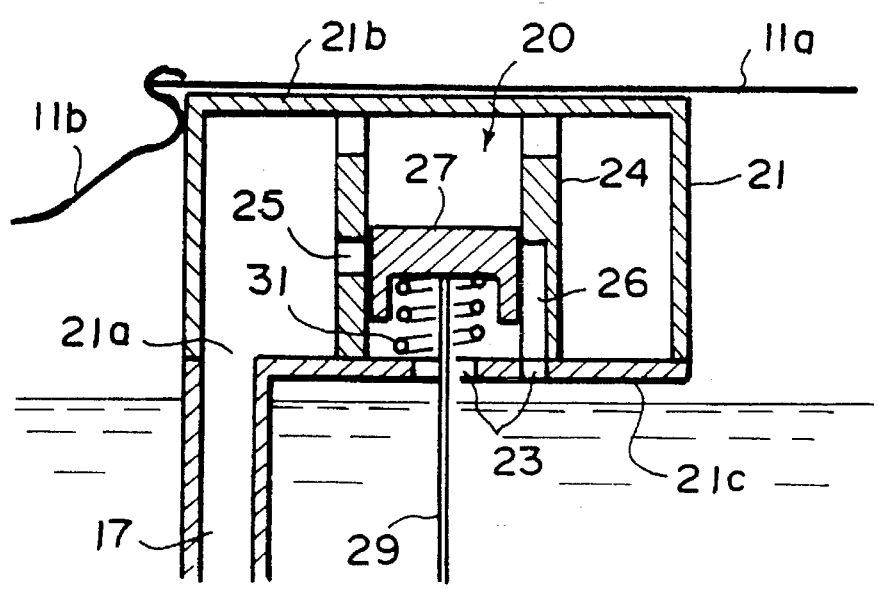
FIG. 2 is a detailed view showing a remaining volume alarm unit shown in FIG. 1.

As can be seen from FIG. 2 showing an enlarged view of the chief elements, an upper plate 21b of the remaining volume alarm unit 20 is adjoined to a wall of the container body 11a, and the alarm unit has a certain size of an internal space. A hollow cylinder 24 vertically extended is centered inside the casing 21, and holes 23 connected to the internal cylinder space of the container body 11a are formed in a part of the bottom plate 21c of the casing 21 defined by the bottom of the cylinder 24, whilst the upper part of the casing 21 is opened in the vicinity of the upper plate 21b of the casing 21. Also, a connecting passage 25 opened into the internal space of the casing is formed in the middle of the cylinder 24. A port 26 is formed on the side of the cylinder opposite to the passage 25, and downwardly extends from substantially the same position as the passage 25 to the hole 23 of the bottom plate 21c.

A piston-shaped vibrating member 27 is vertically slidably inserted in the cylinder 24, and a resilient member 31 made of a coil spring is attached to the bottom of the vibrating member 27. The resilient member 31 projects itself further downwards than the lower end of the vibrating member 27, so that the vibrating member 27 is floatingly supported. An internal gas pressure of the container body 11a acts on the bottom surface of the vibrating member 27 via the connecting holes 23, and this vibrating member 27 is raised by the burst of contained gas, whereby the upper end of the vibrating member produces a sound when caused to collide against the upper plate 21b of the casing 21, i.e., a wall surface of the container body 11a.

When the vibrating member 27 is in a free moving state, the passage 25 formed on the side wall of the cylinder 24 is closed by the vibrating member 27. This passage is positioned lower than the lower end of the vibrating member 27 when the vibrating member 27 goes up, and is hence opened. Meanwhile, when the vibrating member 27 is in a free moving state, the upper end of the port 26 is closed by the vibrating member 27. When the vibrating member 27 moves to its lower position against the resilient member 31, the port 26 is situated above the upper end of the vibrating member 27, and is hence opened.

A damping member 38 is connected to the vibrating member 27 by way of a coupling member 29. In other words, the lower end of the coupling member 29, with the upper end thereof fixed to the vibrating member 27, is extended through the hole 23 of the bottom plate 21c of the casing 21 to the vicinity of an opposite end wall of the container body 11a which is kept away from the internal space of the container with the liquefied fuel laid therebetween, and the damping member 38 is connected to the lowermost end of the coupling member 29.

The damping member 38 is subjected to large resistance while moving in the liquefied fuel F, and provides the vibrating member 27 with resistance so that a speed of movement of the vibrating member 27 can be reduced.

When the volume of the remaining fuel is reduced to approximately a predetermined level, the resistance to which the damping member 38 is subjected significantly drops, and hence a deceleration effect on the movement of the vibrating member is reduced in accordance with variations in fuel level. When the volume of remaining liquefied fuel F is reduced to the predetermined level or less, the deceleration effect on the damping member 38 disappears, which in turn causes the vibrating member 27 to move freely and to collide with the wall of the container body.

The operation of the foregoing embodiment will now be described. When the discharge of gas contained in the cylinder is not carried out as shown in FIG. 1, the vibrating member 27 comes to rest at a lower position in the cylinder 24, and the resilient member 31 also remains in contact with the bottom plate 21c. In this free moving state, the resilient member 31 is deformed in accordance with the weight of the vibrating member 27 (including the combined weight of the coupling member 29 and the damping member 38), and the vibrating member 27 locating at its lower position closes the passage 25 and the port 26, so that the gas flow guide channel 17 is disconnected from the internal space of the container. Thus, when the gas is not being discharged, the damping member 38 is located deep in the liquefied fuel F when a large volume of liquefied fuel F is stored as shown in FIG. 1. When the volume of the remaining fuel is decreased, the volume of liquefied fuel existing above the damping member 38 is reduced.

Figure 3:
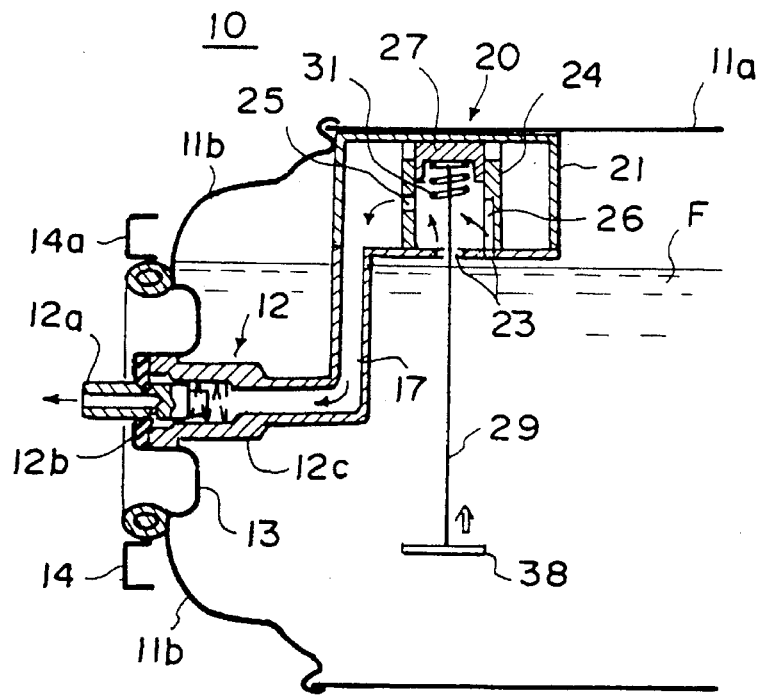
FIG. 3 is a cross sectional view showing chief elements of the cassette type gas cylinder shown in FIG. 1 when it is supplying vaporized gas.

When gas is emitted by opening the valve 12, internal pressures of the gas flow guide channel 17 and the casing 21 drop, and this in turn causes a difference between pressures acting on the upper and lower sides of the vibrating member 27 to be increased, whereby force which thrusts the vibrating member 27 upwards becomes larger. Thereafter, as shown in FIG. 3, the vibrating member 27 moves up along the cylinder 24, and when the vibrating member 27 goes up higher than the passage 25, the gas flow guide channel 17 is connected with the internal space of the cylinder. Evaporated gas within the container 11 is emitted from the valve 12 by way of the holes 23 on the bottom of the casing 21, the passage 25, internal spaces of the casing and the gas flow guide channel 17.

When the volume of the remaining fuel is large, the damping member 38 is subjected to large resistance while moving in the liquefied fuel together with the rising of the vibrating member 27, and this resistance causes the speed of movement of the vibrating member 27 to be decreased. Therefore, the upper end of the vibrating member 27 will not collide with the wall of the container body 11a, or will produce too small a sound to be recognized even when caused to collide with the wall.

When the volume of the liquefied fuel F is reduced to approximately the predetermined level, a period during which the damping member 38 is subjected to the resistance of the liquefied fuel is shortened compared with the case when the volume of the liquefied fuel is large, and hence the deceleration effect on movement of the vibrating member 27 is also reduced to a lesser extent.

Figure 5:
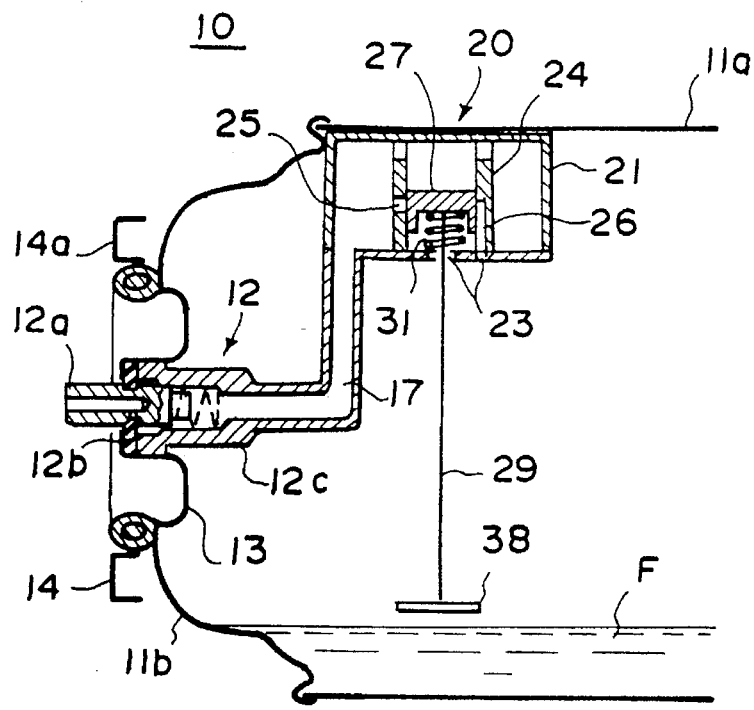
FIG. 5 is a cross sectional view showing chief elements of the cassette type gas cylinder shown in FIG. 1 when its fuel is reduced.
Figure 6:
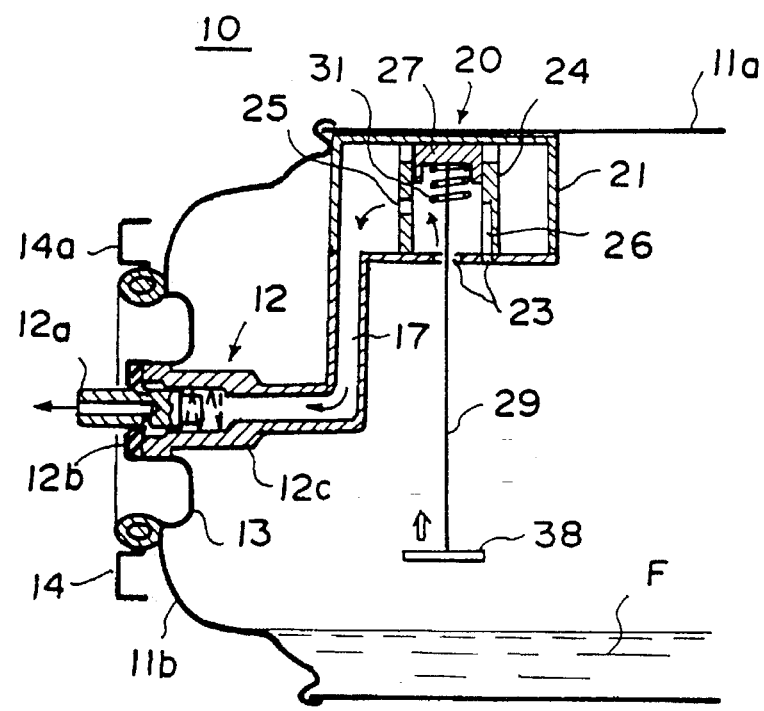
FIG. 6 is a cross sectional view showing chief elements of the cassette type gas cylinder shown in FIG. 1 when it is sounding an alarm.
Figure 9A:
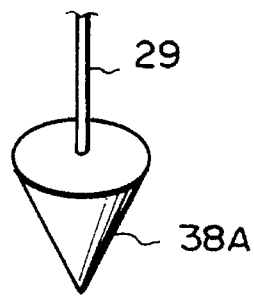
FIGS. 9A to 9D are perspective views showing modified various examples of a damping member shown in FIG. 1.
Figure 9B:
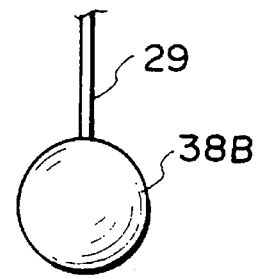
Figure 9C:
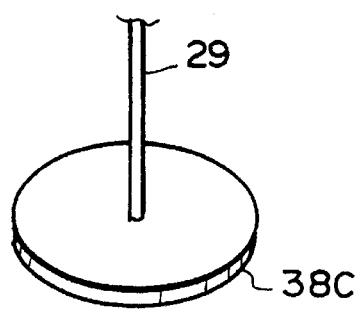
Figure 9D:
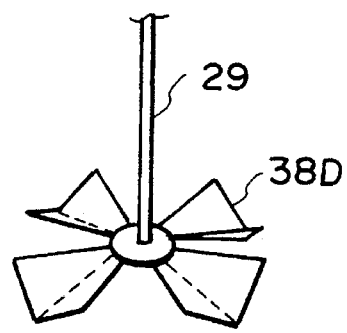

When the level of the liquefied fuel F is reduced to the predetermined level or less as shown in FIG. 5, the resistance to which the damping member 38 is subjected while moving in the liquefied fuel F is substantially reduced, and the deceleration effect on the movement of the vibrating member 27 resulting from the burst of contained gas is almost entirely lost. Hence, as shown in FIG. 6, the upper end of the vibrating member 27 forcefully collides with the wall of the container body 11a, thereby giving an alarm for the volume of the remaining fuel.

When the passage 25 is opened due to the elevation of the vibrating member 27, the liquefied fuel contained in the container body 11a is supplied via the gas flow guide channel 17, then discharged from the valve 12 in the same manner as mentioned above. In association with the opening of the passage 25, the pressure difference which thrusts the vibrating member 27 upwards is canceled, and the vibrating member 27 moves down under its own weight after having collided against the wall of the container body. This causes the passage 25 to be closed again as shown in FIG. 7, thereby interrupting the supply of gas. However, further emission of gas from the gas flow guide channel 17 induces a pressure inside the gas flow guide channel to be substantially reduced to the atmospheric pressure, which in turn causes a difference between pressures acting on the upper and lower sides of the vibrating member 27 to become larger in the same manner as before. Thus, the vibrating member 27 is thrust upwardly again, and then produces a sound when caused to collide with the wall of the cylinder.

Such vertical motion of the vibrating member 27 recur during the discharge of gas, and when the vibrating member 27 is made of steel, resulting large collision sounds travel directly as an alarm through the cylinder wall to the outside, whereby users can clearly realize the reduction of the volume of the remaining fuel.

While collision sounds are being produced by the vertical motions of the vibrating member 27, the flow of discharged gas from the gas cylinder 10 through the valve 12 becomes a pulsating flow. In a commonly used gas apparatus, a gas pressure regulator valve (governor) is interposed between a cylinder connector and a burner. Therefore, even if the gas flow becomes a pulsating flow as mentioned above, the supply of gas to the burner is smoothed by this gas pressure regulator valve. This ensures that normal combustion of the burner continues, and hence the remaining volume alarm unit 20 is prevented from being affected by the pulsating flow.

Figure 4:
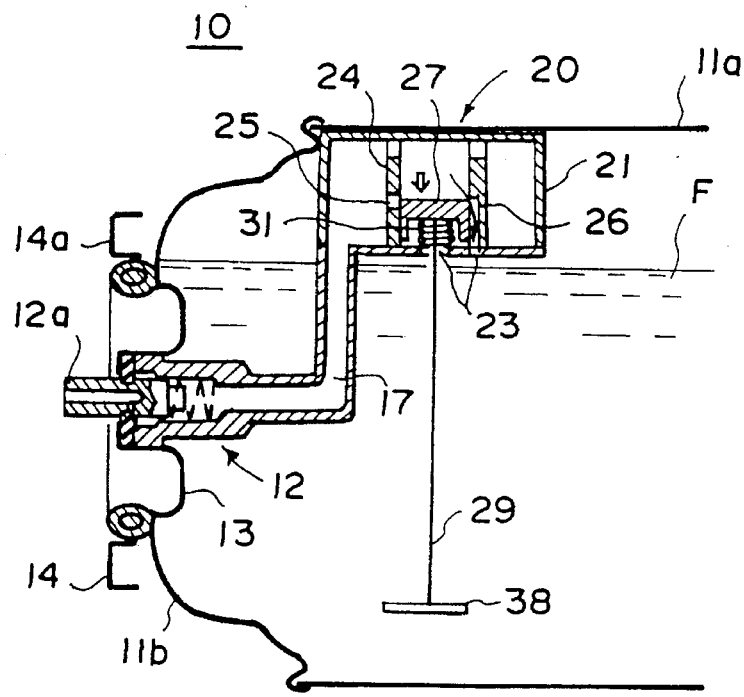
FIG. 4 is a cross sectional view showing chief elements of the cassette type gas cylinder shown in FIG. 1 in a degassed state.

When the cylinder 10 is filled with gas, or when a temperature of the gas flow guide channel 17 becomes higher while the guide channel 17 remains disconnected from the internal space of the cylinder as shown in FIGS. 1–5, resulting in an increase of a pressure in the gas flow guide channel (refer to a third embodiment which will be described later). The vibrating member 27 is forced down as shown in FIG. 4, and the vibrating member 27 further moves down deforming the resilient member 31 downwardly. When the upper end of the vibrating member 27 causes the upper end of the port 26 to be opened, the gas flow guide channel 17 is connected with the internal space of the cylinder, and hence degassing (counter-pressure regulation) is effected, wherein high pressure gas in the gas flow guide channel 17 enters the internal space of the cylinder via the port 26. This prevents gas escaping from the cylinder.

When the passage 25 is closed, the vibrating member 27 does not produce a collision sound unless a pressure difference caused by the discharge of gas occurs. When the gas cylinder 10 or a gas apparatus equipped with this cylinder is not used, and when the attitude of the container 11 is not horizontally arranged, no alarm is given, and hence the raising of an alarm resulting from erroneous operations of the alarm unit is avoided.

The coupling member 29 connecting the vibrating member 27 to the damping member 38 may be made of a rod-shaped rigid body, but can also be made of a resilient member as shown in FIG. 8. In practice, a coupling member 29A made of a string or a wire, a coupling member 28B made of a coil, or a coupling member 29C made of a leaf spring may be suitably employed so that the assembly characteristic of the gas cylinder 10 can be improved.

The gas cylinder 10 is assembled by the steps of: integrating the valve 12, the gas flow guide channel 17 and the remaining volume alarm unit 20 with the lid 13 in the form of a unit; crimping the circumferential edge of the top 11b with the open periphery of the container body 11a; and attaching the lid 13 integrated with the remaining alarm unit 20 to the center of the top 11b. The assembly characteristic of the gas cylinder is improved, because the coupling member 29 is deformed, changing the position of the damping member 38 when the casing 21 of the remaining volume alarm unit 20 is inserted through the center aperture of the top 11b, thereby facilitating the insertion of the unit through a narrow aperture.

Damping bodies in various forms as shown in FIG. 9 may be suitably adopted as the damping member 38. In effect, a conical damping member 38A (with its sharp pointed edge facing downwards), a spherical damping member 38B, an annular damping member 38C, or a damping member 38D having V-shaped blades (with its ridge pointing downwards) may be employed. The damping members 38A and 38D are subjected to large resistance of the liquefied fuel while moving upwards, so that a large deceleration effect affects the vibrating member 27. These damping members, however, are subjected to lesser resistance when moving downwards, and hence they can move much faster. Thus, the structure of the damping member is arranged to improve its connection with the vibrating member 27.

The vibrating member 27 should preferably be produced from metal, and other members should be made of plastic. A counter member with which the vibrating member 27 is caused to collide to produce a sound is a wall of the container body 11a which adjoins to the upper plate 21b of the casing 21, or may be an independent sounding body provided on the cylinder.

Figure 10:
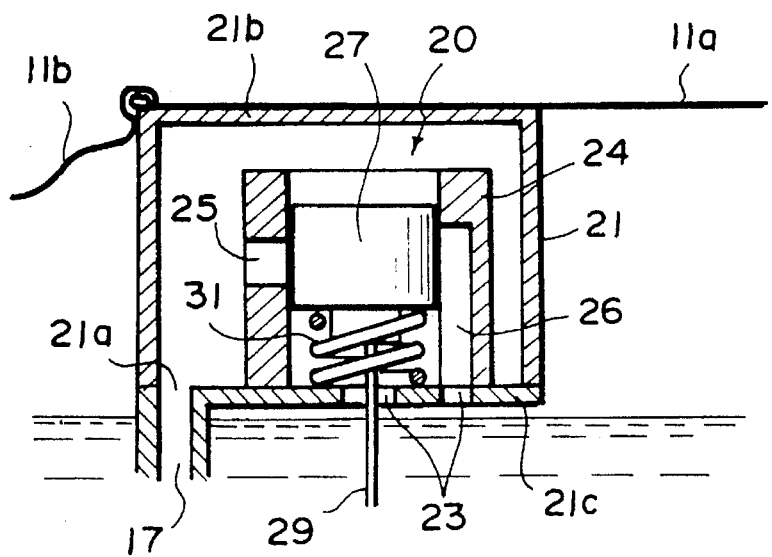
FIG. 10 is an enlarged cross sectional view showing chief elements of a modified example of a vibrating member shown in FIG. 1.

FIG. 10 shows a modified example of the vibrating member 27. The diameter of this vibrating member 27 is reduced without changing its own weight. The resilient member 31, which is made of a coil spring and surrounds a protuberance downwardly raised from the bottom of the vibrating member 27, is sandwiched between the vibrating member and the bottom plate 21c of the casing 21. In terms of temperature characteristics, the reduction of the diameter of the vibrating member 27 is preferable. The rest of the cylinder according to this modified example is the same as the first embodiment.

Figure 11:
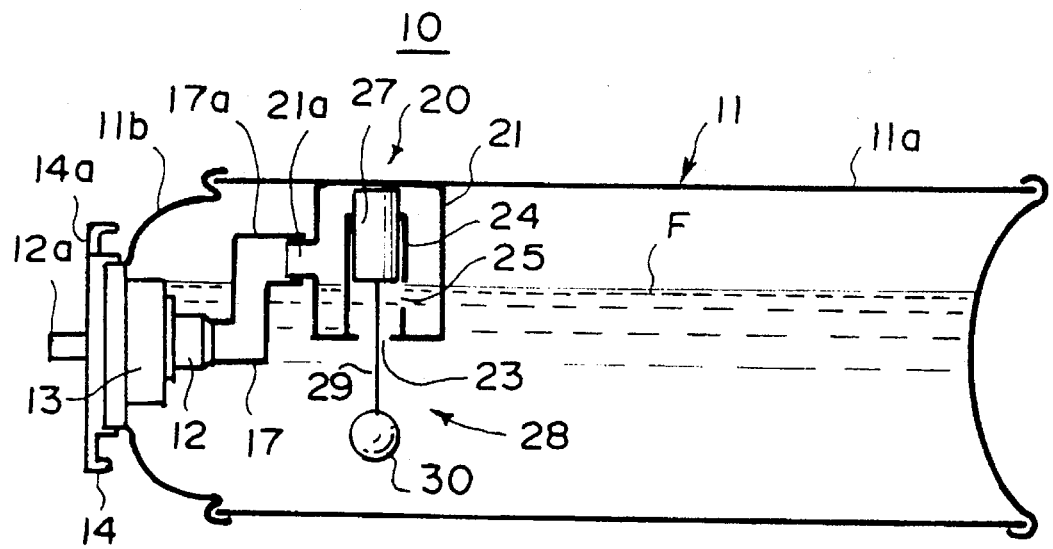
FIG. 11 is a schematic cross sectional view showing a cassette type gas cylinder according to a second embodiment of this invention.
Figure 12:
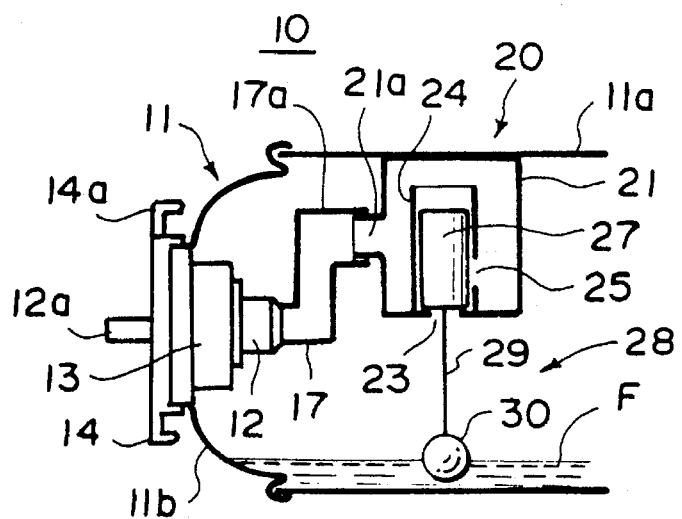
FIG. 12 is a cross sectional view showing chief elements of the cassette type gas cylinder when its fuel content is reduced.
Figure 13:
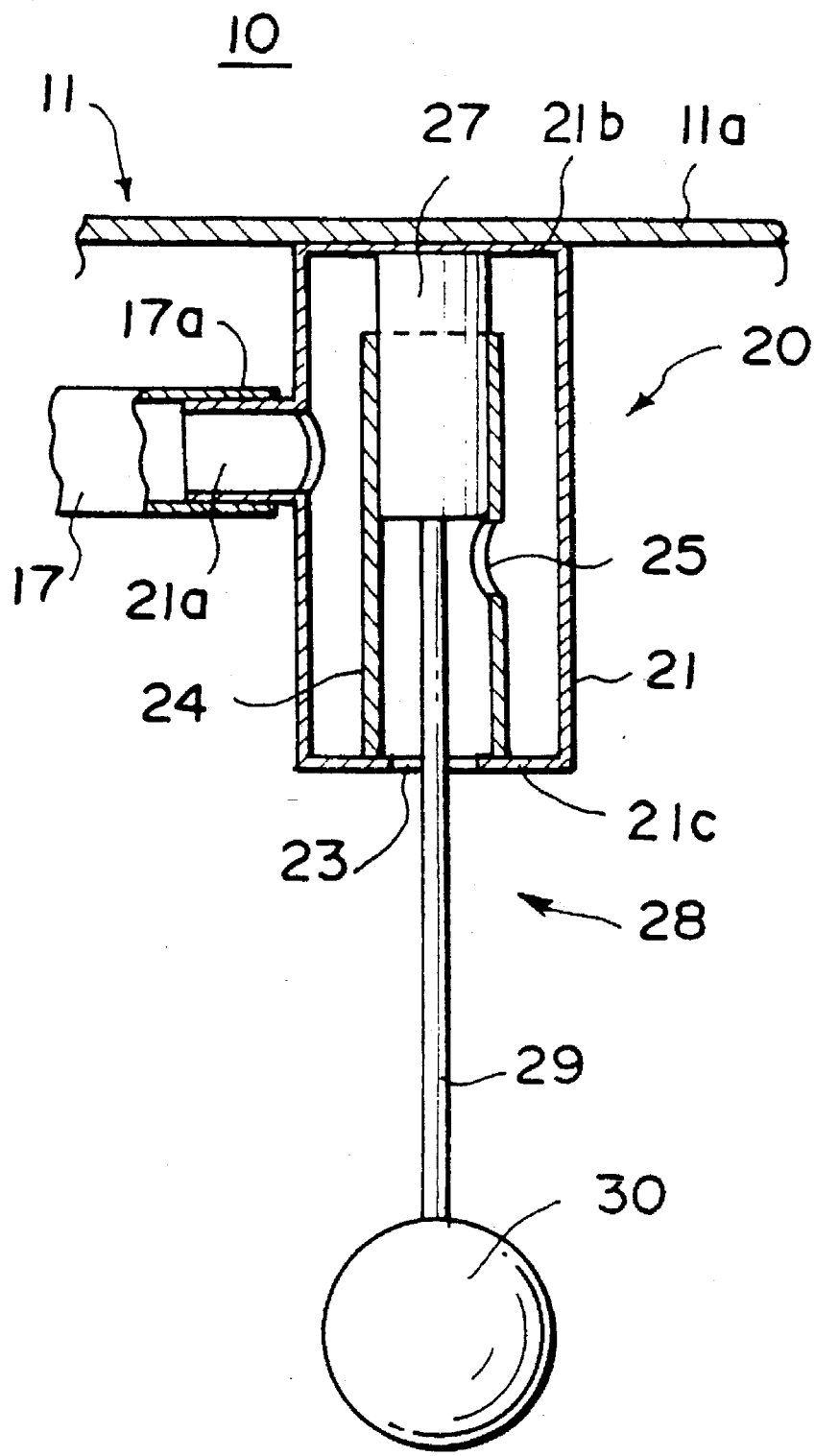
FIG. 13 is a detailed view showing a remaining volume alarm unit shown in FIG. 11.

Second Embodiment:

FIGS. 11 to 13 show a cassette type gas cylinder according to a second embodiment of this invention. In this embodiment, a floating member is used in the remaining volume alarm unit to detect a liquid level. Though the present embodiment slightly differs in structure from the first embodiment, the same reference numerals are provided to designate the corresponding features of the first embodiment, and the explanation thereof will be omitted here for clarity.

The container 11 and the valve 12 of the gas cylinder 10 are constituted in the same manner as those of the first embodiment. The end section 17a of the gas flow guide channel 17 connected with the valve 12 is connected to a pipe-shaped outflow port 21a projectedly formed on the side wall of the casing 21 of the remaining volume alarm unit 20.

As shown in an enlarged view of FIG. 13, in the remaining volume alarm unit 20, the upper part of the casing 21 is attached to a wall of the container body 11a, and a connecting hole 23 connected to an internal space of the container body 11a is formed at the center of a bottom plate 21c of the casing 21. A longitudinally extended tube-shaped cylinder 24 is centered in the casing 21, and the bottom of the cylinder 24 is fixed to the outer edge of the connecting hole 23 formed in the bottom plate 21c of the casing 21. An upper part of the cylinder is opened in the vicinity of the upper side plate of the container body 11a. A connecting passage 25 for connecting the casing 21 with the internal space of the casing is formed at an intermediate location on the side wall of the cylinder 24.

A piston-shaped vibrating member 27 is slidably inserted vertically in this cylinder 24. The bottom surface of the vibrating member 27 is subjected to an internal pressure of the container body 11a via the connecting hole 23, and this vibrating member 27 moves up by means of the burst of contained gas. This vibrating member 27 produces a sound when caused to collide with the upper plate 21b of the casing 21, that is, the wall of the container body 11a. The connecting passage 25 formed on the side wall of the cylinder 24 is located lower than the lower end of the vibrating member 27 when the vibrating member 27 moves up, and hence the connecting passage 25 becomes open.

A floating member 30 which moves up and down in accordance with the volume of remaining liquefied fuel F contained in the container 11 is also arranged inside the container 11. The floating member 30 is connected to the vibrating member 27 via a coupling member 29 which serves as a link mechanism 28 for deterring the vibrating member from colliding with the wall of the container body when the volume of remaining liquefied fuel F is larger than a predetermined amount. Practically, the upper end of the link member 29 is connected to the bottom of the vibrating member 27 through the connecting hole 23, whilst the lower end of the link member is attached to the floating member 30.

The vibrating member 27 moves in association with vertical movement of the floating member 30 which correspond to a fuel level. The range of movement of the vibrating member is limited in accordance with the length of the casing 21. The floating member 30 falls when the volume of remaining liquefied fuel F is reduced to a predetermined level or less. When the vibrating member 27 is displaced to close the connecting hole 25, the vibrating member 27 is rendered free to move, and collides with the wall of the container body.

The operation of the gas cylinder according to this embodiment will be described. As shown in FIG. 11, when a large volume of liquefied fuel F is stored in the container body 11a, the upper end of the vibrating member 27 is forced against the wall of the container body 11a, that is, the upper plate 21b of the casing 21 in response to the rising of the floating member 30. At this time, the vibrating member 27 is prevented from vibrating, and the connecting passage 25 of the cylinder 24 is opened. If the discharge of gas is effected by opening the valve 12, the vibrating member 27 will not collide with the wall of the container body, and therefore collision sounds will not be produced. In this state, gas contained in the container body 11a enters the cylinder 24 through the connecting hole 23 formed on the bottom of the casing 21, and flows into the gas flow guide channel 17 from the outflow port 21a via the connecting passage 25 and the inside of the casing 21.

Meanwhile, as shown in FIG. 12, when the volume of the remaining fuel F inside the container 11 is reduced in accordance with the supply of fuel gas, and the level of the fuel is lowered to the predetermined level or less; namely, it becomes necessary to replace the gas cylinder 10 with a new one. In response to the lowering of the fuel level, the floating member 30 moves down under its own weight which includes the weight of the vibrating member 27, which in turn causes the vibrating member 27 to be lowered. When the gas is not discharged, the lower end surface of the vibrating member 27 moves down to a position where the end surface comes into contact with the bottom of the cylinder 24 surrounding the connecting hole 23, so that the connecting passage 25 is closed by this vibrating member 27.

When the discharge of gas is initiated by opening the valve, gas contained in the casing 21 and gas flow guide channel 17 is emitted, and hence a pressure inside the casing and gas flow guide channel drops substantially to the atmospheric pressure. The bottom surface of the vibrating member 27 is subjected to the pressure of fuel gas contained inside the container body 11a. A difference between pressures acting on both upper and lower sides of the vibrating member 27 is increased, and when the force which thrusts the vibrating member 27 upwards becomes larger than the force corresponding to the combined weight of the vibrating member 27, the coupling member 29 and the floating member 30, then this vibrating member 27 moves up along the cylinder 24. This causes the upper end of the vibrating member to collide with the wall of the container body 11a, that is, the upper plate 21b of the casing 21, thereby producing a sound resulting from the collision of the two metal components with each other.

Together with the rising of the vibrating member 27, the connecting passage 25 is opened, and fuel gas contained in the container body 11a is supplied via the gas flow guide channel 17 and finally given off from the valve 12. The opening of this connecting passage 25 cancels the pressure difference which thrusts the vibrating member 27 upwards, and the vibrating member 27 goes down under its own weight after the upper end thereof has collided with the wall of the container body. Then, the connecting passage 25 is closed again, and the supply of gas is interrupted. Further discharge of gas contained inside the gas flow guide channel 17 causes a pressure of this flow guide channel to drop substantially to the atmospheric pressure. In the same manner as mentioned above, a difference between pressures acting on the upper and lower surfaces of the vibrating member 27 becomes larger, whereupon the vibrating member 27 is thrust upwards and caused to collide with the wall of the container body, thereby producing a sound.

The gas cylinder, according to this embodiment, can be filled with gas with its upside, as shown in FIG. 11, facing down. The vibrating member 27 in the form of a column in this embodiment may be shaped into other configurations, for example, a sphere.

The link mechanism 28 is made up of the coupling member 29 directly fixed to the vibrating member 27, and is arranged to enable the vibrating member to collide with the wall of the container body when the level of liquefied fuel is lowered below the predetermined level. This link mechanism may be arranged to release the vibrating member 27 locked in its upper position in response to the lowering of the fuel level so that the vibrating member can go down along the cylinder 24 and then become free to move and thus collide with the wall of the container body.

Figure 14:
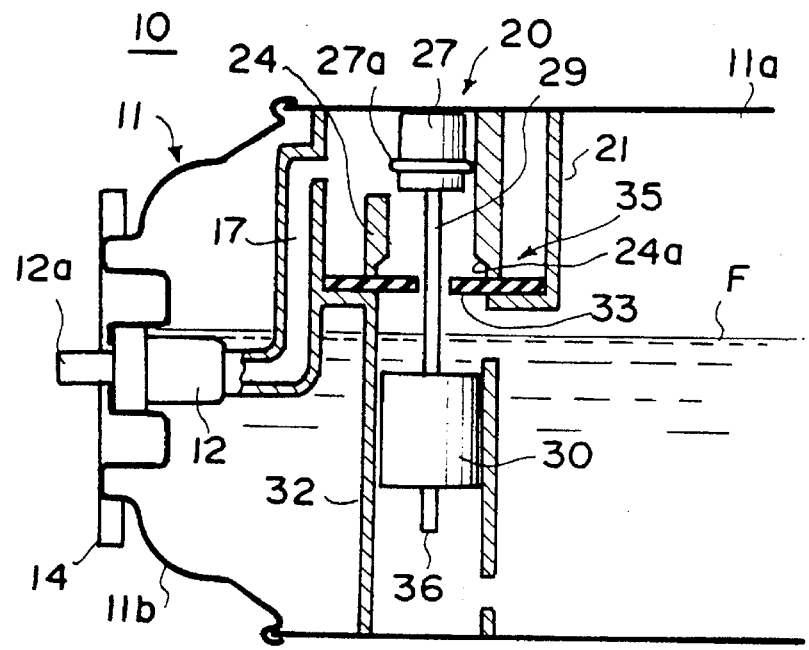
FIG. 14 is a cross sectional view showing chief elements of a cassette type gas cylinder according to a third embodiment of this invention.
Figure 15:
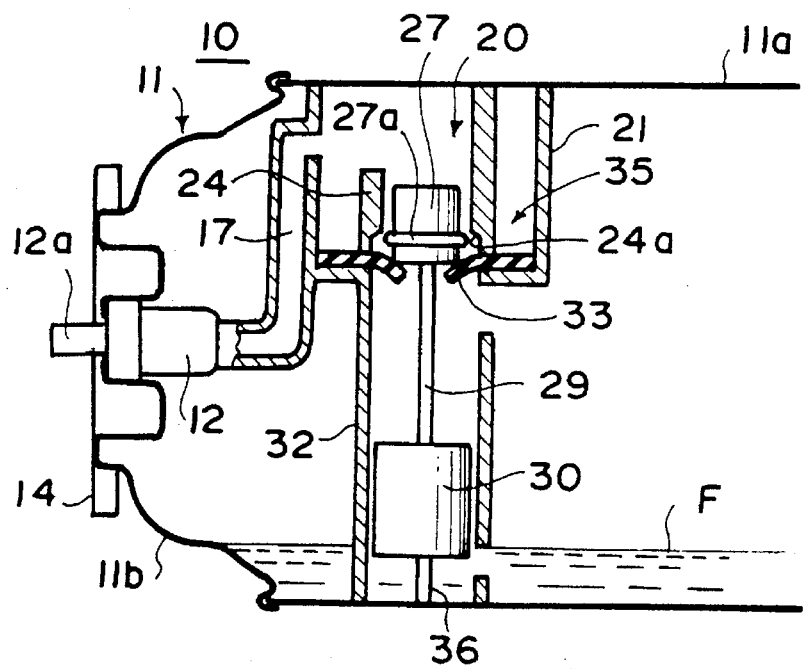
FIG. 15 is a cross sectional view showing chief elements of the cassette type gas cylinder, shown in FIG. 14, in a degassed state.

Third Embodiment:

FIGS. 14 and 15 show a third embodiment of this invention. In this embodiment, the remaining volume alarm unit 20 using a floating member is provided with a degassing mechanism for counter pressure adjustment purposes. The same reference numerals are provided to designate the corresponding features of the first embodiment, and the explanation thereof will be omitted here for clarity.

In the remaining volume alarm unit 20 of this embodiment, a seal ring member 27a for filling a gap between the outer surface of the vibrating member 27 and the inside of the cylinder 24 is formed at a given height on the outer surface of the vibrating member 27 which slides along the inside of the cylinder 24. This vibrating member 27 is connected to the floating member 30 by means of the coupling member 29, and the floating member 30 is slidably and floatingly arranged in a guide member 32, into which the liquefied fuel F freely flows, in response to variations in fuel level.

A resilient member 33 made of rubber is disposed on the bottom of the cylinder 24, and an aperture through which the coupling member 29 passes is formed at the center of the resilient member 33. The length of the cylinder 24 is set short so that the seal made between the seal ring 27a and the inner surface of the cylinder 24 can be removed, and hence the gas flow guide channel 17 can be connected to the internal space of the gas cylinder when the upper end of the vibrating member 27 is elevated to a position where it comes into contact with the wall of the container body. The connecting passage 25 the same as that shown in FIG. 11 is also formed.

A port 24a with a large internal diameter is formed at a lower portion of the cylinder 24, and this port causes the seal made between the seal ring 27a and the cylinder 24 to be broken. This port 24a is formed at a position where the under surface of the vibrating member 27 comes into contact with the resilient member 33. When the combined weight of the vibrating member 27, the coupling member 29 and the floating member 30 act on the resilient member 33, the resilient member 33 is deformed to a small degree. In this state, the seal ring 27a of the vibrating member 27 is situated above the port 24a, so that the seal between the seal ring 27a and the internal surface of the cylinder 24 is maintained. When a pressure inside the gas flow guide channel 17 exceeds the internal pressure of the cylinder by a predetermined value or more, so that the resilient member 33 is downwardly deformed, then the seal ring 27a eventually moves to the port 24a, thereby opening the hole of the resilient member 33.

A protuberance 36 is formed on the bottom surface of the floating member 30 in order to restrict a lowermost position of the range of movement of the vibrating member 27. In this embodiment, the gas flow guide channel 17, the cylinder 24, the casing 21 and the guide member 32 are integrated with each other.

The operation of the gas cylinder according to this embodiment will now be described. As shown in FIG. 14, when the volume of remaining liquefied fuel F is large, the vibrating member 27 moves up to the top of the cylinder 24 in response to the rising of the floating member 30, so that the seal made between the seal ring 27a and the internal surface of the cylinder 24 is broken. Gas contained in the cylinder 10 is discharged by way of the gas flow guide channel 17 upon opening of the valve 12. At this time, the vibrating member 27 is prevented from vibrating, and hence no collision sound is produced.

When the liquefied fuel F is reduced, then the fuel level is lowered to a predetermined level or less, and the vibrating member 27 also falls in association with the lowering of the floating member 30. When there is no discharge of contained gas, the seal ring 27a is fitted into the cylinder 24, so that the gas flow guide channel 17 is disconnected from the internal space of the cylinder. In the meantime, when gas is emitted by opening the valve 12, the pressure inside the gas flow guide channel 17 drops, which in turn causes a difference between pressures acting on the upper and lower surfaces of the vibrating member 27 to be increased. When the force which thrusts the vibrating member 27 upwards becomes larger than the force corresponding to the combined weight of the vibrating member 27, the coupling member 29 and the floating member 30, the vibrating member 27 goes up along the cylinder 24. Then, the upper end of the vibrating member 27 collides with the wall of the container body 11a, thereby raising an alarm for the volume of the remaining fuel as with the foregoing embodiment.

When the gas flow guide channel 17 is disconnected from the internal space of the gas cylinder, the internal pressure of the gas flow guide channel 17 may increase as a result of a rise in temperature inside the guide channel 17 which is caused by a difference in temperature between the gas flow guide channel 17 and the inside of the container. For instance, temperatures of a burner and a governor rise under the influence of a combustion temperature as a gas apparatus is used. Radiation heat is transferred to either a connecter interposed between the gas apparatus and the gas cylinder or the gas flow guide channel 17, whereupon the temperature of the connector or the gas flow guide channel rises. To the contrary, the temperature inside the gas cylinder 10 is lowered by the latent heat produced when the liquefied fuel F evaporates. When the gas apparatus is extinguished, and when the gas flow guide channel 17 is disconnected from the internal space of the container by the lowering of the vibrating member 27 as mentioned above, the temperature of the gas flow guide channel 17 rises, and hence its pressure is also increased. When the pressure of the gas flow guide channel 17 rises excessively, gas may escape from the connector connecting the valve 12 with the gas apparatus.

Thus, when the pressure inside the gas flow guide channel 17 goes above the internal pressure of the gas cylinder, a difference between pressures acting on the upper and lower surfaces of the vibrating member 27 is increased in a reversed direction. This causes the vibrating member 27 to be depressed to come into contact with the resilient member 33. Since the amount of force acting on the vibrating member is large, the under surface of the vibrating member 27 moves further down while it is deforming the resilient member 33 downwardly. The seal ring 27a moves to the port 24a, thereby opening the seal. High pressure gas within the gas flow guide channel 17 reversely enters the cylinder via the resilient member 33, and this causes the pressure inside the gas flow guide channel 17 to drop, whereby the escape of gas from the connector as mentioned above is avoided. The protuberance 36 of the floating member 36 defines a limit of downward movement of the vibrating member 27.

Figure 16:
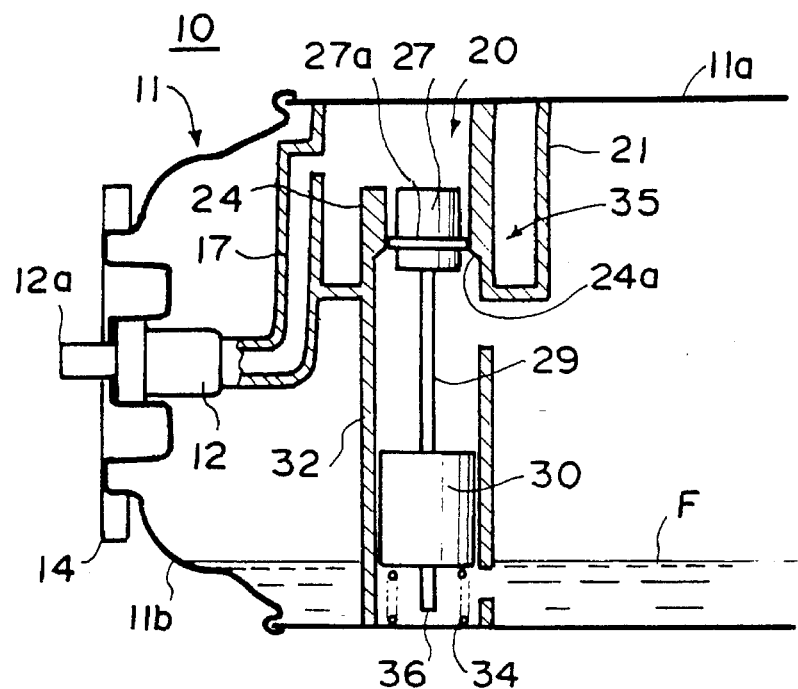
FIG. 16 is a cross sectional view showing chief elements of a modified example of the cassette type gas cylinder according to the third embodiment.

FIG. 16 shows a modified example of a gas cylinder according to the third embodiment. Instead of the resilient plate shown in FIG. 14, a resilient member 34 made of a compressed coil spring is disposed under the bottom of the floating member 30. The structure of the rest of this example is the same as that show in FIG. 14, and this modified gas cylinder is also provided with a similar remaining volume alarm unit and a function of degassing the gas flow guide channel 17 using the port 24a. This gas cylinder may also be provided with the resilient member 31 as shown in the first embodiment.

Figure 17:
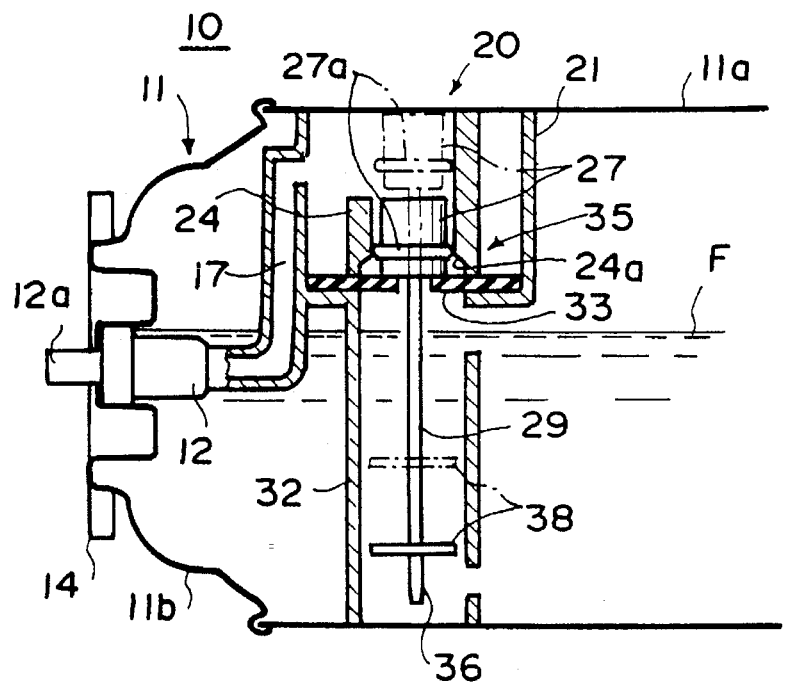
FIG. 17 is a cross sectional view showing chief elements of a cassette type gas cylinder according to a fourth embodiment.

Fourth Embodiment:

A gas cylinder, according to this example, is provided with a similar damping member 38 to that of the first embodiment instead of the floating member 30 of the third embodiment as shown in FIG. 17.

In the same manner as shown in FIG. 14, the upper end of the coupling member 29 is connected to the under surface of the vibrating member 27 which is slidably arranged in the cylinder 24, and a disk-shaped damping member 38 is attached to the vicinity of the lower end of the coupling member 29. The rest of the gas cylinder of this embodiment is arranged in the same manner as that shown in FIG. 14, and the same reference numerals are provided to the corresponding features of the third embodiment.

The operation of this embodiment will now be described. When there is no discharge of the contained gas, the vibrating member 27 is fitted into the cylinder 24 under its own weight, whereupon the seal ring 27a of the vibrating member 27 is fitted to the internal surface of the cylinder 24, so that the gas flow guide channel 17 is disconnected from the internal space of the gas cylinder. Thus, when there is no discharge of the gas, and when the volume of remaining liquefied fuel F is large, the damping member 38 is positioned deep in the liquefied fuel F. And when the volume of the remaining fuel is decreased, the volume of liquefied fuel existing above the damping member 38 is reduced.

When the discharge of gas is initiated by opening the valve 12, the pressure of the gas flow guide channel 17 drops, and a difference between pressures acting on the upper and lower surfaces of the vibrating member 27 is also increased. This causes the force which thrusts the vibrating member 27 upwards to be increased, and hence the vibrating member 27 moves up along the cylinder 24. When the vibrating member 27 moves up higher than the cylinder 24, the gas flow guide channel 17 is connected to the internal space of the gas cylinder, whereby the discharge of gas continues. However, when the volume of the remaining fuel is large, the damping member 38 is subjected to large resistance while moving in the liquefied fuel in accordance with the rising of the vibrating member 27. This causes the speed of movement of the vibrating member 27 to be decreased, and hence the upper end of the vibrating member 27 will not collide with the wall of the container body. Even if it collides with the wall, a sound resulting from the collision will be too small to be heard as an alarm.

When the quantity of liquefied fuel F is reduced, and the fuel level is lowered to a predetermined level or less, then the damping member 38 is subjected to lower resistance while moving in the liquefied fuel. This causes the speed of movement of the vibrating member 27 to be increased, and the upper end of the vibrating member to collide with the wall of the container body 11a, thereby producing a collision sound as an alarm for the volume of the remaining fuel in the same manner as the previous embodiment.

When there is no discharge of the contained gas, and when the gas flow guide channel 17 is disconnected from the internal space of the gas cylinder, an increase in pressure of the gas flow guide channel 17 resulting from an increase in temperature of the same causes the vibrating member 27 to move downwards. As with the previous embodiment, the vibrating member 27 goes down deforming the resilient member 33 downwardly, and the seal ring 27a is displaced to the port 24a, thereby breaking the seal. High pressure gas inside the gas flow guide channel 17 reversely enters the gas cylinder by way of the resilient member 33.

Even in this embodiment, instead of the resilient member 33 made of a resilient plate, the resilient member 31 shown in FIG. 1 or the resilient member 34 made of a compressed spring shown in FIG. 16 may be attached to the bottom side of the damping member 38.

According to the cassette type gas cylinders set forth in the above, the gas cylinder is provided with: a gas flow channel with one end thereof connected to a valve which opens and closes the discharge of gas and the other end thereof opened into a gas space formed above the level of liquefied fuel contained when the gas cylinder is laid horizontally; a movable vibrating member disposed in the gas flow guide channel for producing a sound when vibrated and caused to collide with a body by the burst of contained gas; a damping member which moves in accordance with the volume of liquefied fuel remaining in the container and also located below a predetermined level of the liquefied fuel gas; and a link mechanism with one end connected to the vibrating member and with the other end connected to the damping member or a floating member by means of a coupling member. With this structure, the floating member suppresses the production of a collision sound made by the vibrating member by providing the vibrating member with resistance when the volume of remaining liquefied fuel is above a predetermined level, thereby avoiding the issue of an alarm.

Meanwhile, when the volume of the remaining fuel is reduced to a predetermined level or less, the damping member allows the vibrating member to move freely, and to collide with the wall of the container body, and hence the vibrating member collides with the container body's wall or a sounding body in response to the discharge of gas by way of the gas flow guide channel, thereby producing a collision sound as an alarm. This collision sound travels to the outside very well even when produced inside the closed container, and the alarm indicating the reduction of the remaining fuel can be clearly recognized from the outside, whereby it becomes possible to prevent unforeseeable consumption of fuel.

Since the production of an alarm is effected by the use of burst energy of the contained fuel gas, the gas cylinder does not need any driving source, for example, a battery for actuating the alarm unit. This makes the structure of the gas cylinder simple, and also prevents the alarm unit from being erroneously actuated when the gas cylinder is not set in a gas apparatus.

Figure 18:
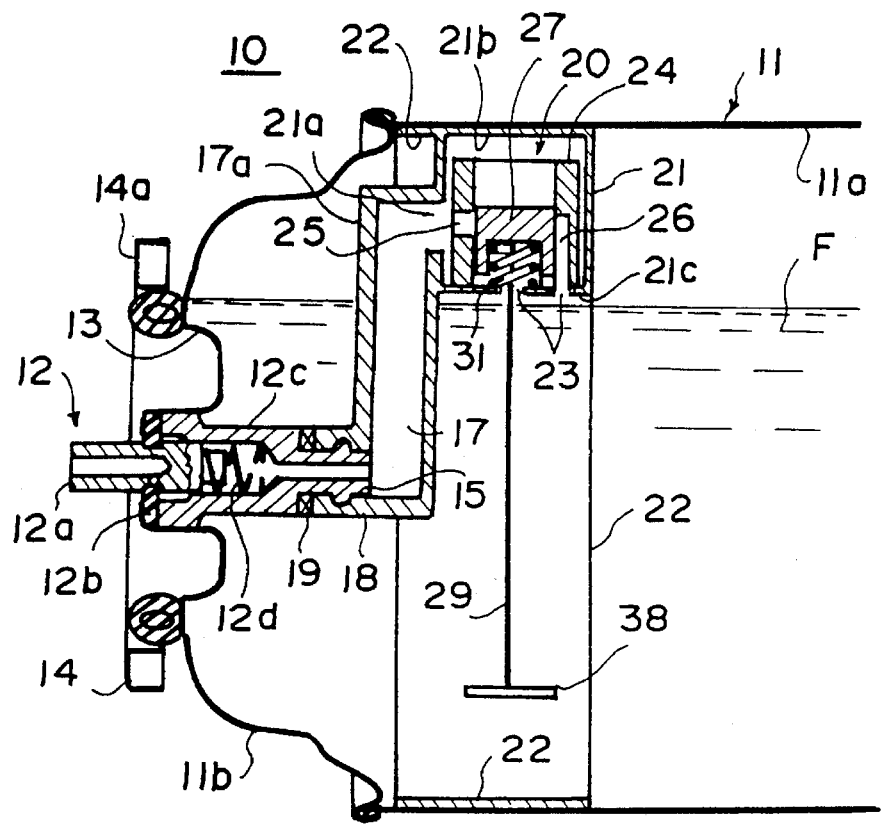
FIG. 18 is a chief cross sectional view showing a cassette type gas cylinder according to a fifth embodiment.
Figure 19:
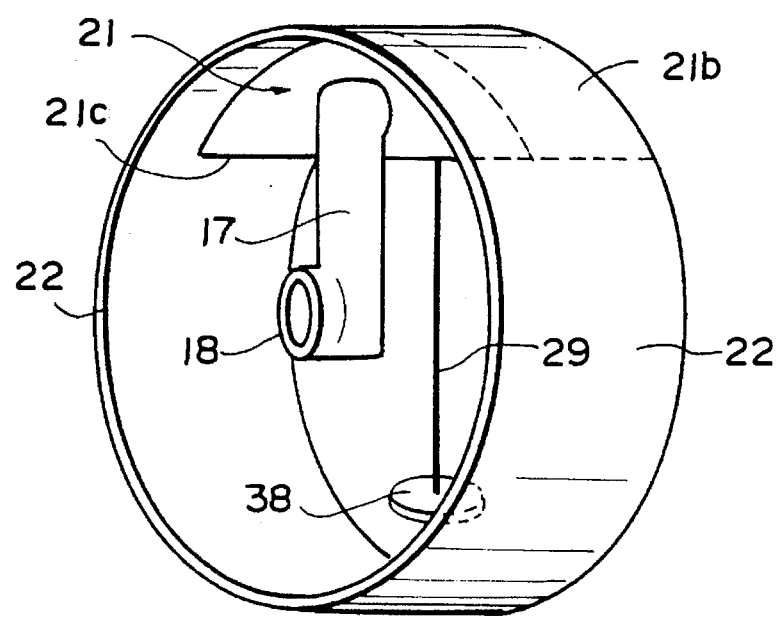
FIG. 19 is a perspective view showing a remaining volume alarm unit shown in FIG. 18.

Fifth Embodiment:

FIG. 18 is a longitudinal cross sectional view showing a cassette type gas cylinder according to this embodiment. The same reference numerals are provided to designate the corresponding features of the first embodiment, and the explanation thereof will be omitted here for clarity.

Figure 21:
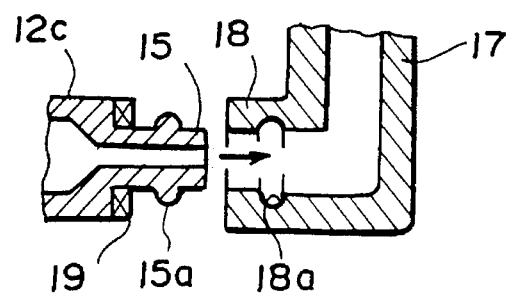
FIG. 21 is a partially enlarged view showing the cassette type gas cylinder shown in FIG. 18.

A gas flow guide channel 17, connected with the valve 12 to introduce evaporated gas contained in the container body 11a, is connected to the inner end of the housing 12c of the valve 12. The structure of this gas flow guide channel 17 is arranged in such a manner that it is hermetically connected to the valve 12 by axially fitting the end of the gas flow guide channel 17, arranged in line with the axis of the container, to the end of the housing 12c of the valve 12. Practically, as shown in FIG. 21, an insert section 15 with an annular flange 15a is formed on the end of the housing 12c, and an engaging section 18 with an annular recessed rim 18a, which is fitted to the projecting flange 15a, is formed on the axial end of the gas flow guide channel 17. A seal member 19 is also sandwiched between the end of the housing 12c and the axial end of the gas flow guide channel 17.

The gas flow guide channel 17 is axially extended to the center of the container body 11a from the housing 12c of the valve 12, and also bent in the same direction as the nicked indentation 14a of the flange 14 is formed. The remaining end section 17a is connected to an outflow port 21a of a casing 21 of a remaining volume alarm unit 20.

When the gas cylinder 10 is used, it is laid horizontally with the indentation 14a directed to the upper side. In this state, a hole 23 of the case 21 connected with an internal cylinder space of the container body 11 is situated in a gas space above the level of liquefied fuel F. When the valve 12 is opened, evaporated gas is discharged along the gas flow guide channel 17 via the remaining volume alarm unit 20. This gas flow guide channel 17 is produced from plastic, and may be integrated with the casing 21, or may be separately formed.

An outer surface 21b of the casing 21 is shaped into a bow so that it can fit with the internal surface of the container body 11a, and a bottom plate 21c is formed into a plane parallel to the level of the fuel. The outer surface 21b of the casing 21 is connected to a ring-shaped supporting member 22 which is circumferentially extended. The outer surface 21b of this casing 21 and the supporting member 22 are integrated together. The supporting member 22 has an extension toward the valve, and therefore the width of the supporting member 22 is larger than that of the casing 21. The remaining end section 17a of the gas flow guide channel 17 is connected to a front surface of the casing 21. In an assembled state, the outer surface 21b of the casing 21 is fitted to the internal surface of the container body 11a.

A hollow cylinder 24 vertically extended is centered inside the casing 21, and holes 23 connected to an internal space of the container body 11a are formed in a part of the bottom plate 21c of the casing 21 defined by the bottom of the cylinder 24, whilst the upper part of the casing 21 is opened in the vicinity of the upper plate 21b of the casing 21. Also, a passage 25 connected to the internal space of the casing is formed in the middle of the cylinder 24. A port 26 is formed on the side of the cylinder opposite to the passage 25, and downwardly extends from substantially the same position as the passage 25 to the hole 23 of the bottom plate 21c. The upper end of the cylinder 24 may be fixed to the outer surface 21b of the casing 21, and an aperture for preventing hermetic closing may be formed on a part of the cylinder.

A piston-shaped vibrating member 27 is slidably inserted vertically in the cylinder 24, and a resilient member 31 made of a coiled spring is inserted into the bottom of the vibrating member 27. The resilient member 31 projects itself further downwards than the lower end of the vibrating member 27, so that the vibrating member 27 is floatingly supported. An internal gas pressure of the container body 11a acts on the bottom surface of the vibrating member 27 via the connecting holes 23, and this vibrating member 27 is raised by the burst of contained gas, whereby the upper end of the vibrating member produces a sound when caused to collide against the upper plate 21b of the casing 21, i.e., a wall surface of the container body 11a.

When the vibrating member 27 is in a free moving state, the passage 25 formed on the side wall of the cylinder 24 is closed by the vibrating member 27. This passage is positioned lower than the lower end of the vibrating member 27 when the vibrating member 27 goes up, and hence opened. Meanwhile, when the vibrating member 27 is in a free moving state, the upper end of the port 26 is closed by the vibrating member 27. When the vibrating member 27 moves to its lower position against the resilient member 31, the port 26 is situated above the upper end of the vibrating member 27, and hence opened.

A damping member 38 is connected to the vibrating member 27 by way of a coupling member 29. In other words, the lower end of the coupling member 29, with the upper end thereof fixed to the vibrating member 27, is extended through the hole 23 of the bottom plate 21c of the casing 21 to the vicinity of an opposite end wall of the container body 11a which is kept away from the internal space of the container with the liquefied fuel laid therebetween, and the damping member 38 is connected to the lowermost end of the coupling member 29.

The damping member 38 is subjected to large resistance while moving in the liquefied fuel F, and provides the vibrating member 27 with resistance so that a speed of movement of the vibrating member 27 can be reduced. When the volume of the remaining fuel is reduced to approximately a predetermined level, and when the damping member 38 travels in evaporated fuel gas, the resistance to which the damping member 38 is subjected significantly drops, and hence a deceleration effect on the movement of the vibrating member is reduced. When the volume of remaining liquefied fuel F is reduced to the predetermined level or less, the deceleration effect on the damping member 38 disappears, which in turn causes the vibrating member 27 to move freely.

Figure 20:
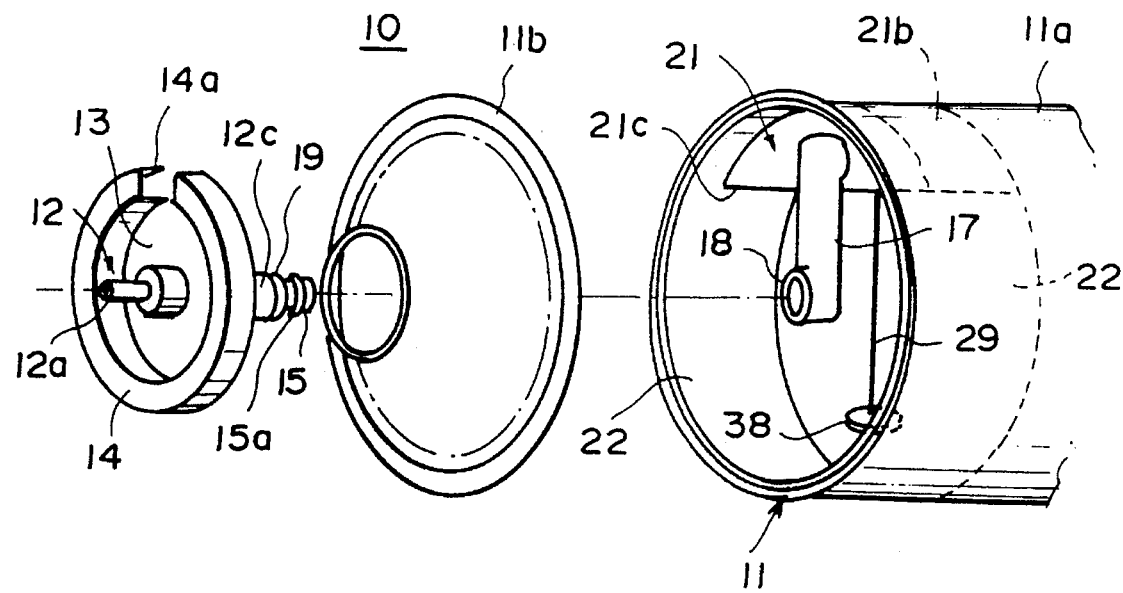
FIG. 20 is a perspective view showing the cassette type gas cylinder, shown in FIG. 18, when it is being assembled.

The assembly of the gas cylinder 10 will now be described. First, as shown in FIG. 20, the top 11b of the container body 11a of the container 11 and the lid 13 to which the valve 12 is attached to are produced separately each other. The casing 21 incorporating the remaining volume alarm unit 20, the supporting member 22 and the gas flow guide channel 17 are integrated together. Then, the casing 21 is inserted into the container body 11a, and fixed to a predetermined position with the supporting member 22 by welding. Subsequently, an open edge of the container body 11a and the outer periphery of the top 11b are joined together by crimping. The lid 13 is attached to the center of the center aperture of the top 11b, and they are joined together by radially and extendedly crimping the outer edge of the lid 13. When the lid 13 is attached to the top 11b, the insert 15 of the housing 12c of the valve 12 is fitted into the engaging section 18 of the gas flow guide channel 17 so that they can be hermetically connected with each other.

The operation of the foregoing embodiment will now be described. When there is no discharge of gas contained in the cylinder as shown in FIG. 18, the vibrating member 27 comes to rest at a lower position in the cylinder 24, and the resilient member 31 also remains in contact with the bottom plate 21c. In this free moving state, the resilient member 31 is deformed in accordance with the weight of the vibrating member 27 (including the combined weight of the coupling member 29 and the damping member 38), and the vibrating member 27 locating at its lower position closes the passage 25 and the port 26, so that the gas flow guide channel 17 is disconnected from the internal space of the container. Thus, when there is no discharge of gas, the damping member 38 is located deep in the liquefied fuel F when a large volume of liquefied fuel F is stored as shown in FIG. 18. When the volume of the remaining fuel is decreased, the volume of liquefied fuel existing above the damping member 38 is reduced.

When gas is emitted by opening the valve 12, internal pressures of the gas flow guide channel 17 and the casing 21 drop, and this in turn causes a difference between pressures acting on the upper and lower sides of the vibrating member 27 to be increased, whereby force which thrusts the vibrating member 27 upwards becomes larger. Thereafter, the vibrating member 27 moves up along the cylinder 24, and when the vibrating member 27 goes higher than the passage 25, the gas flow guide channel 17 is connected with the internal space of the cylinder. Evaporated gas within the container 11 is emitted from the valve 12 by way of the holes 23 on the bottom of the casing 21, the passage 25, internal spaces of the casing and the gas flow guide channel 17.

When the volume of the remaining fuel is large, the damping member 38 is subjected to large resistance while moving in the liquefied fuel together with the rising of the vibrating member 27, and this resistance causes the speed of movement of the vibrating member 27 to be decreased. Therefore, the upper end of the vibrating member 27 will not collide with the wall of the container body 11a, or will produce too small a sound to be recognized even when caused to collide with the wall.

When the volume of the liquefied fuel F is reduced to approximately the predetermined level, a period during which the damping member 38 is subjected to the resistance of the liquefied fuel is shortened, compared with a case when the volume of the liquefied fuel is large, and hence the deceleration effect on the vibrating member 27 is also reduced to a lesser extent.

When the liquefied fuel F is reduced to the predetermined level or less, the resistance to which the damping member 38 is subjected while moving in the liquefied fuel F is substantially reduced, and the deceleration effect on the vibrating member 27 resulting from the burst of contained gas is almost zero. Hence, the upper end of the vibrating member 27 forcefully collides with the wall of the container body 11a, thereby giving an alarm for the volume of the remaining fuel.

When the passage 25 is opened in conjunction with the elevation of the vibrating member 27, the liquefied fuel contained in the container body 11a is supplied via the gas flow guide channel 17, and then discharged from the valve 12 in the same manner as mentioned above. In association with the opening of the passage 25, the pressure difference upwardly thrusting the vibrating member 27 is canceled, and the vibrating member 27 moves down under its own weight after having collided with the wall of the container body. This causes the passage 25 to be closed again, thereby interrupting the supply of gas. Further emission of gas from the gas flow guide channel 17 causes the pressure inside the gas flow guide channel to be substantially reduced to the atmospheric pressure, which in turn causes a difference between pressures acting on the upper and lower sides of the vibrating member 27 to be increased in the same manner as before. Thus, the vibrating member 27 is upwardly thrust again, which produces a sound when caused to collide with the wall of the cylinder.

Such vertical movement of the vibrating member 27 recur during the discharge of gas, and the collision sounds directly travel as an alarm through the cylinder wall to the outside, whereby users can clearly realize the reduction of the volume of the remaining fuel. In this case, the capacities of the casing 21 and the gas flow guide channel 17 are small, the speed of variation of the pressure in these sections is much faster, and hence the movement of the vibrating member 27 cannot follow these pressure variations. The capacities are increased by enlarging the gas flow guide channel 17 and side portions of the casing 21 so that the speed of variation of the pressure can be reduced. Thus, the repeated alarm operations is ensured.

While collision sounds are being produced by the vertical movement of the vibrating member 27, the flow of gas discharged from the gas cylinder 10 through the valve 12 becomes a pulsating flow. In a commonly used gas apparatus, a gas pressure regulator valve (governor) is interposed between a cylinder connector and a burner. Therefore, even if the gas flow becomes a pulsating flow as mentioned above, the supply of gas to the burner is smoothed by this gas pressure regulator valve. This ensures that normal combustion of the burner continues, and hence the remaining volume alarm unit 20 is not affected by the pulsating flow.

When the cylinder 10 is filled with gas, or when a temperature of the gas flow guide channel 17 becomes higher while the guide channel 17 remains disconnected from the internal space of the cylinder, then a pressure of the gas flow guide channel rises, the vibrating member 27 is forced down from its free moving state shown in FIG. 18, and the vibrating member 27 further moves down deforming the resilient member 31 downwardly. When the upper end of the vibrating member 27 causes the upper end of the port 26 to be opened, the gas flow guide channel 17 is connected with the internal space of the cylinder, and hence degassing is effected, wherein high pressure gas in the gas flow guide channel 17 enters the internal space of the cylinder via the port 26. This prevents gas from escaping from the cylinder.

Even when the passage 25 is closed, the vibrating member 27 does not produce a collision sound unless a pressure difference caused by the discharge of gas occurs. When the gas cylinder 10 or a gas apparatus equipped with this cylinder is not used, and when the attitude of the container 11 is not horizontally arranged, no alarm is given, and hence the issue of an alarm resulting from erroneous operations of the alarm unit is avoided.

The coupling member 29 connecting the vibrating member 27 to the damping member 38 may be made of a rod-shaped rigid body, but can also be made of a resilient member; for example, a string, a wire, a coil or a leaf spring. The disk-shaped damping member 38 may be formed into another shape such as a cone, a sphere or a body with V-shaped blades. The conical damping member and the damping member with V-shaped blades are subjected to large resistance of the liquefied fuel while moving upwards, but subjected to lesser resistance when moving downwards.

The vibrating member 27 should preferably be produced from metal, and other members should be made of plastic. The wall of the container body 11a adjoining to the upper plate 21b of the casing 21 or an independent sounding body may be used as a counter member with which the vibrating member 27 is caused to collide to produce a sound.

FIGS. 22 to 26 show other methods for fixing the supporting member 22 into the container body 11a using modified examples of the supporting member 22.

Figure 22:
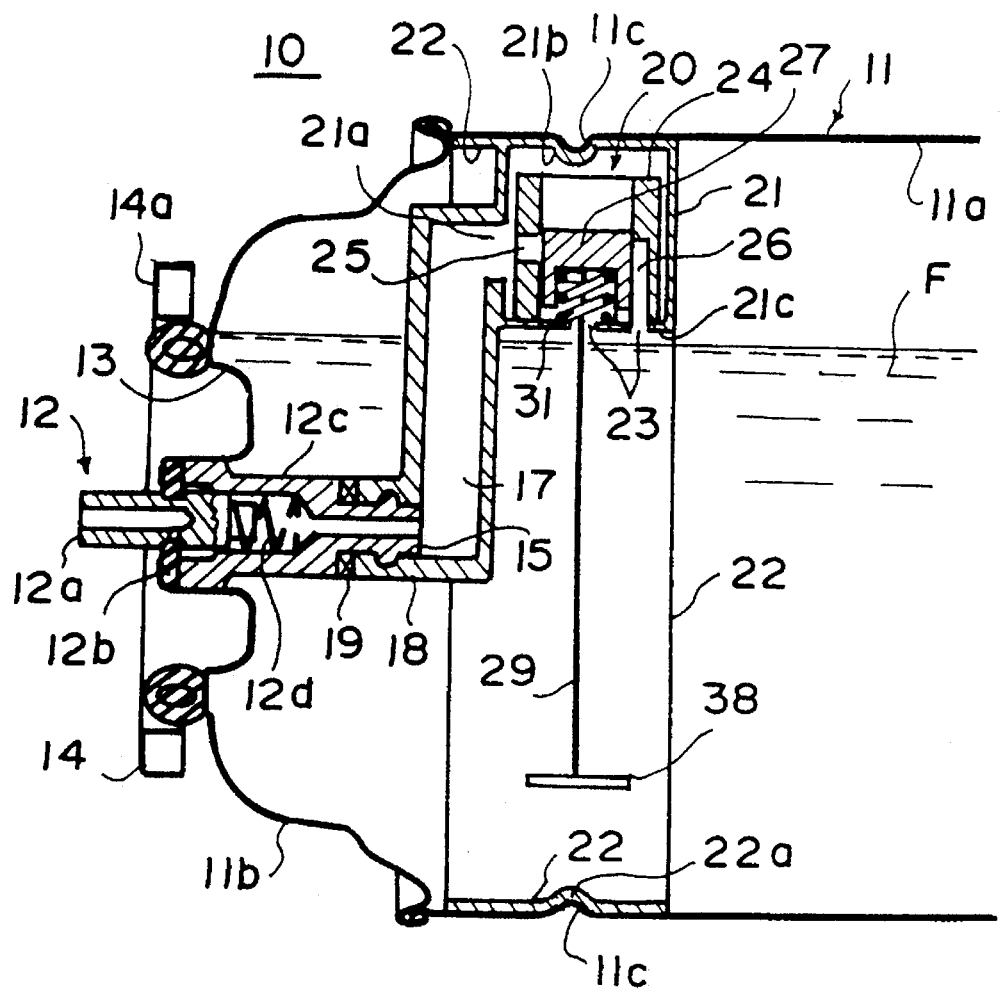
FIG. 22 is a cross sectional view showing chief elements of a first modified example of the cassette type gas cylinder shown in FIG. 18.

In an example shown in FIG. 22, an annular recessed slot 22a is formed on the outer surface of the ring-shaped supporting member 22 (including the outer surface 21b of the casing 21). A raised flange 11c which engages with the slot 22a is formed on the internal surface of the container body 11a. The attachment of the flange with the slot causes the casing 21 to be fixed in position in the container body 11a.

Figure 23:
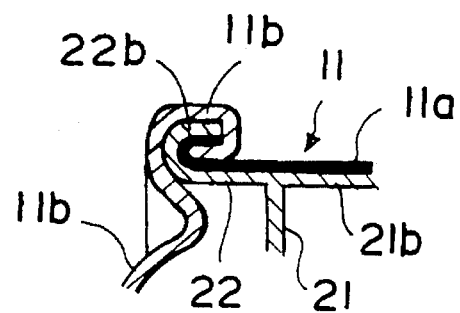
FIG. 23 is a partially enlarged view showing a second modified example of the cassette type gas cylinder shown in FIG. 18.

In an example shown in FIG. 23, a forwardly extended section 22b of the ring-shaped supporting member 22 is folded together with the open edge of the container body 11a and the outer periphery of the top 11b in an integrated manner.

Figure 24:
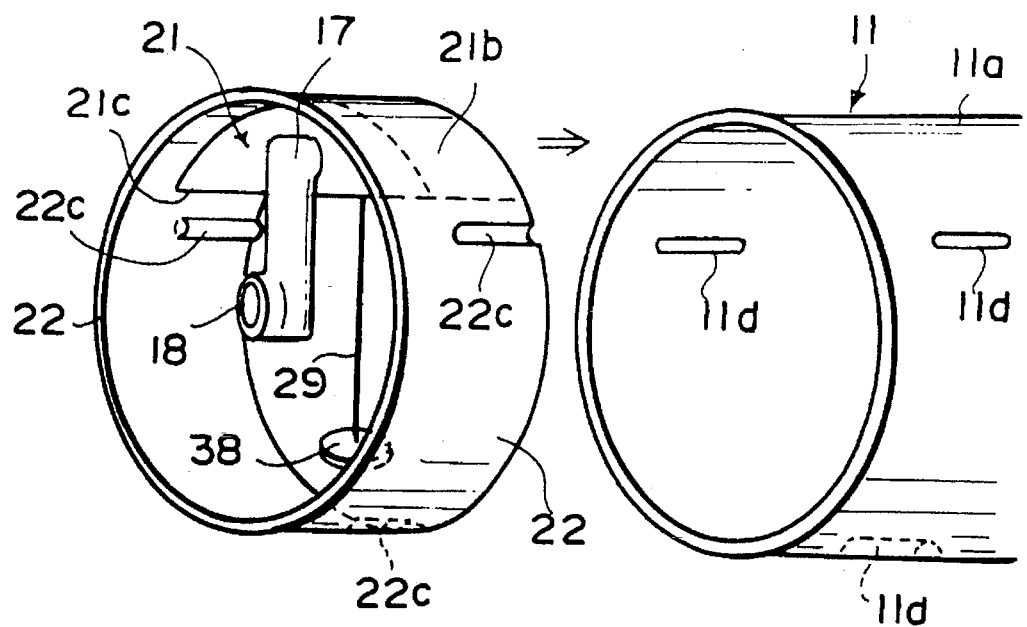
FIG. 24 is a perspective view showing a third modified example of the cassette type gas cylinder shown in FIG. 18.

In an example shown in FIG. 24, longitudinal slots 22c extended along the axis of the container body 11a are formed at three points on the cylindrical surface of the ring-shaped supporting member 22. The inner end of this longitudinal slot 22c is free, and its other end is extended to the middle of the cylindrical surface of the supporting member. Raised flanges 11d axially extended in the same manner as the slots are formed at three points on the internal surface of the container body 11a. The supporting member 22 is fitted into this container body 11a with the raised flanges 11d arranged in alignment with the longitudinal slots 22c, whereby the supporting member is fixed in position.

Figure 25:
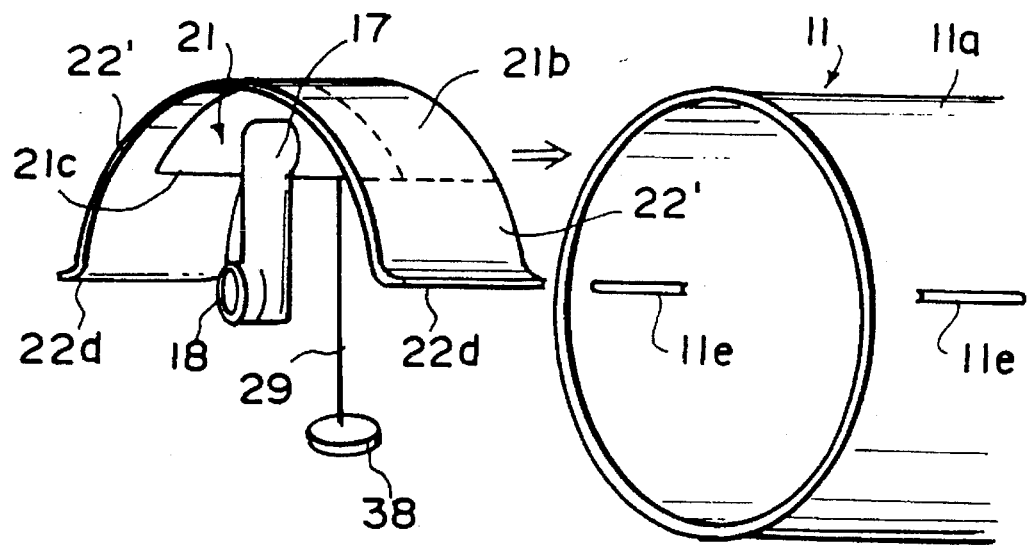
FIG. 25 is a perspective view showing a fourth modified example of the cassette type gas cylinder shown in FIG. 18.

In an example shown in FIG. 25, a supporting member 22' is formed into a semicircular shape and is made of a spring member. Stoppers 22d outwardly bent are formed on opposite ends of the supporting member 22'. A spring force is afforded to the supporting member 22' so that the stoppers 22d can spread outwardly. Axially extended recesses 11e are formed on both sides on the internal surface of the container body 11a. The supporting member 22' is inserted into the container body 11a while being narrowly deformed against its spring force, and the stoppers 22d on both sides of the supporting member 22' are fitted into the recesses 11e, whereby the supporting member 22' is fixed in position.

Figure 26:
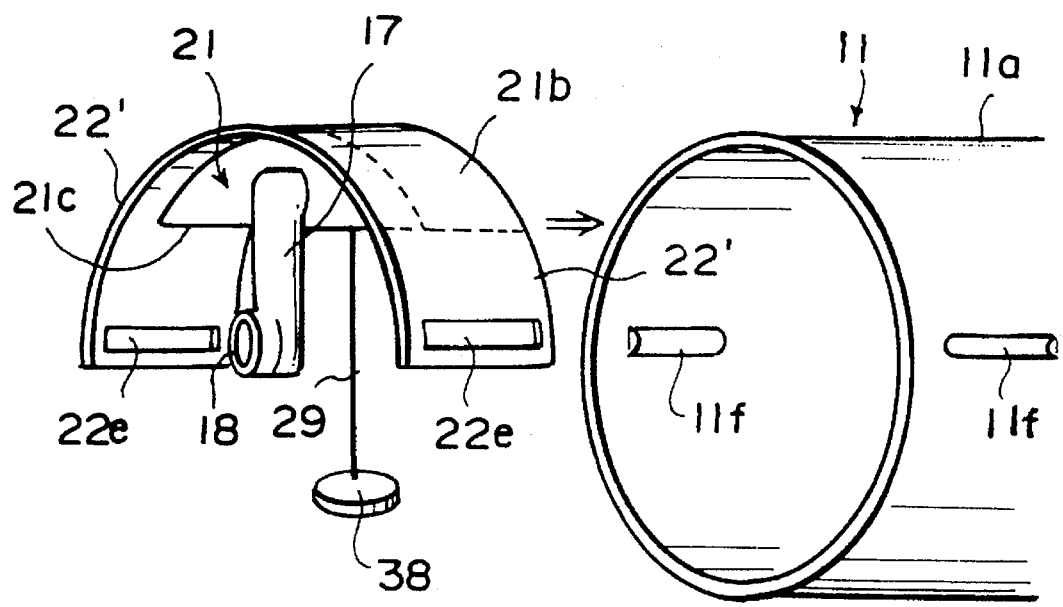
FIG. 26 is a perspective view showing a fifth modified example of the cassette type gas cylinder shown in FIG. 18.
Figure 27:
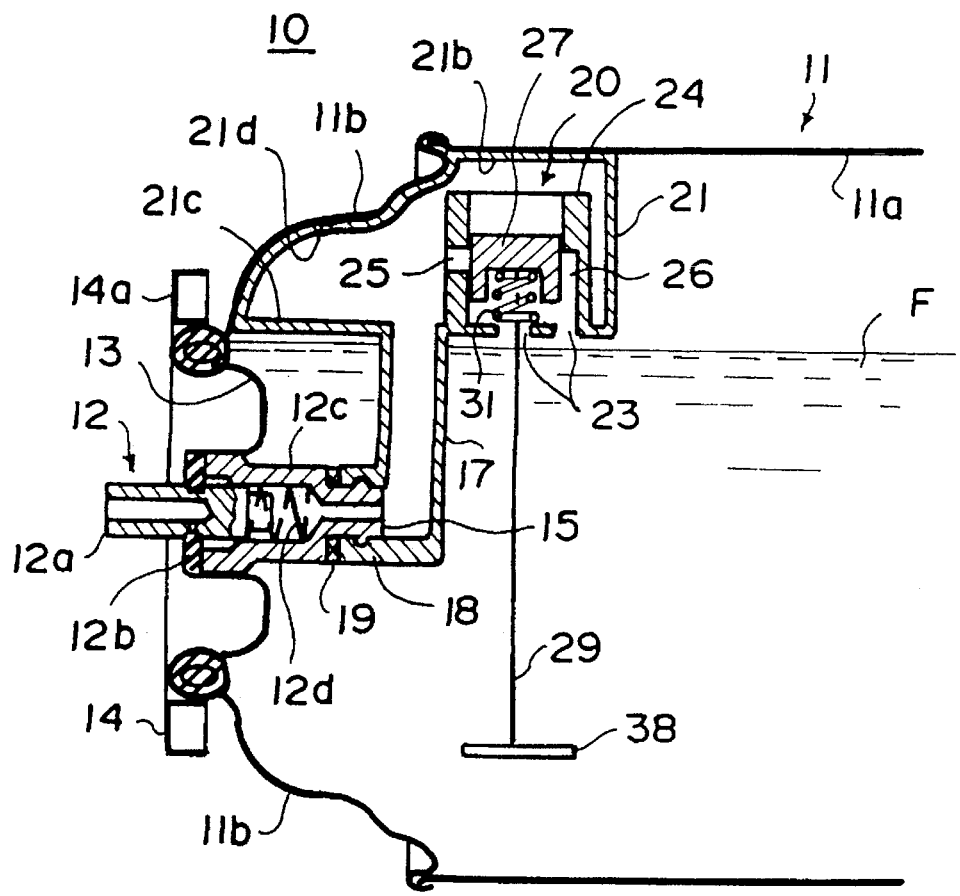
FIG. 27 is a cross sectional view showing chief elements of a cassette type gas cylinder according to a sixth embodiment of this invention.
Figure 28:
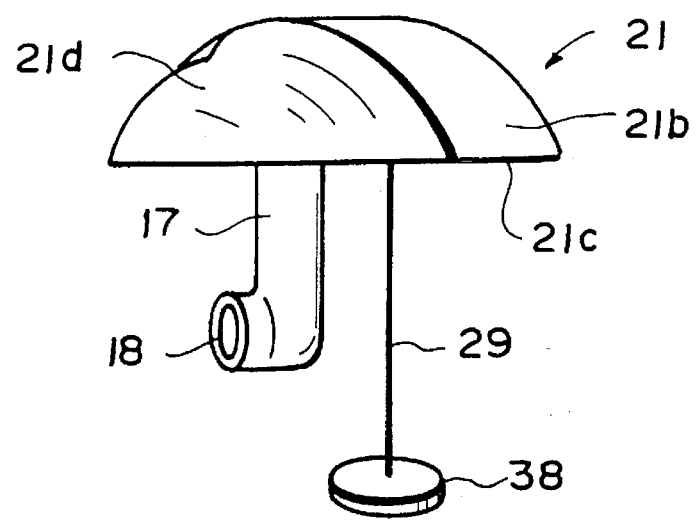
FIG. 28 is a perspective view showing a remaining volume alarm unit shown in FIG. 27.

An example shown in FIG. 26 is similar to that shown in FIG. 25. Slit-shaped open stoppers 22e are formed in the vicinity of both ends of the semicircular supporting member 22' made of a spring material, and a spring force is afforded to the supporting member 22' so that the stoppers 22e can spread to both sides. Axially extended raised flanges 11f are formed on both sides on the internal surface of the container body 11a. The supporting member 22' is inserted into this container body 11a while being narrowly deformed against its spring force. The openings of the stoppers 22e on both sides of the supporting member 22' are fitted with the raised flanges 11f, whereby the supporting member 22' is fixed in position.

Sixth Embodiment:

The container body 11a of the container 11, the top 11b, the lid 13, the valve 12 and the remaining volume alarm unit 20 of the gas cylinder 10 are the same in structure as those of the previous embodiment. As with the previous embodiment, a part of the casing 21 which incorporates the remaining volume alarm unit 20 is provided with the cylindrical outer surface 21b and the lower surface 21c which is in parallel with the level of the contained liquefied fuel. One side surface of this alarm unit, that is, the front side of this unit is projectedly formed into an extended chamber 21d. The extension of this chamber 21d adds greatly to the capacity of the casing. The upper surface of this extended chamber 21d is formed so that it can be fitted to the inner surface of the top 11b.

The upper end of the gas flow guide channel 17 is connected to the lower surface 21c of the extended chamber. 21d. The end of the gas flow guide channel 17 arranged in line with the center of the container is provided with the insert 15, and the end of the housing 12c of the valve 12 is also provided with the engaging section 18 so that these ends can be fitted together. The same reference numerals are provided to designate corresponding features of the previous embodiment, and the explanation thereof is omitted here for clarity.

Figure 29:
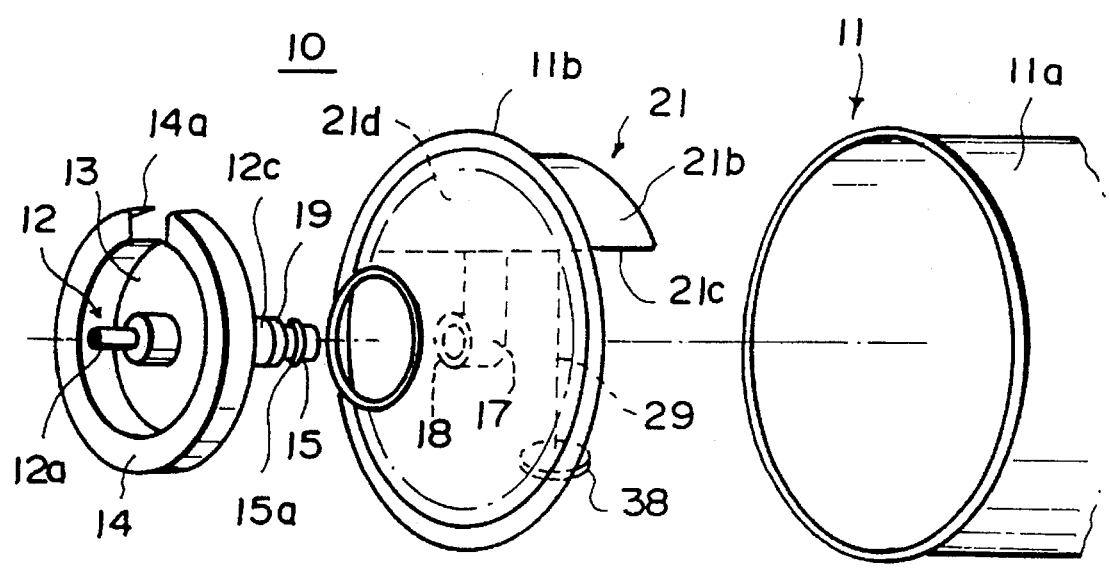
FIG. 29 is a perspective view showing the cassette type gas cylinder, shown in FIG. 27, when it is being assembled.

As shown in FIG. 29, the gas cylinder 10 is assembled by the steps of: making the body 11a of the container 11, the top 11b and the lid 13 to which the valve 12 is attached separately from each other; integrating the casing 21 incorporating the remaining volume unit 20 with the gas flow guide channel 17; fixing the extended chamber 21d of the casing 21 to the inner surface side of the top 11b by welding; attaching the top 11b to the open edge of the container body 11a; crimping the outer edges together; attaching the lid 13 to the center aperture of the top 11b; fitting the insert 15 of the housing 12c of the valve 12 into the engaging section 18 of the gas flow guide channel 17; and crimping the edge of the lid 13 so that it can be extended outwardly.

In the cassette type gas cylinder according to this embodiment, the container body and the top are joined together by fixing the casing which incorporates the remaining volume alarm unit to the container body beforehand, or by attaching the extended chamber of the casing to the top. The end of the valve is then fitted to the end of the gas flow guide channel formed in the casing when the lid to which the valve is fixed is inserted into the top. Thereby, the casing incorporating the remaining volume alarm unit is already arranged inside the container body when the lid is attached to the top. Thus, the assembly of the lid and the connection of the valve with the gas flow guide channel are easily carried out, and hence assembly processes can be performed by machines, whereby the cost of the gas cylinder can be reduced by mass production.

Moreover, the remaining volume alarm unit gives an alarm which indicates the reduction of remaining fuel, and hence it becomes possible to prevent unforeseeable consumption of fuel.

Figure 30:
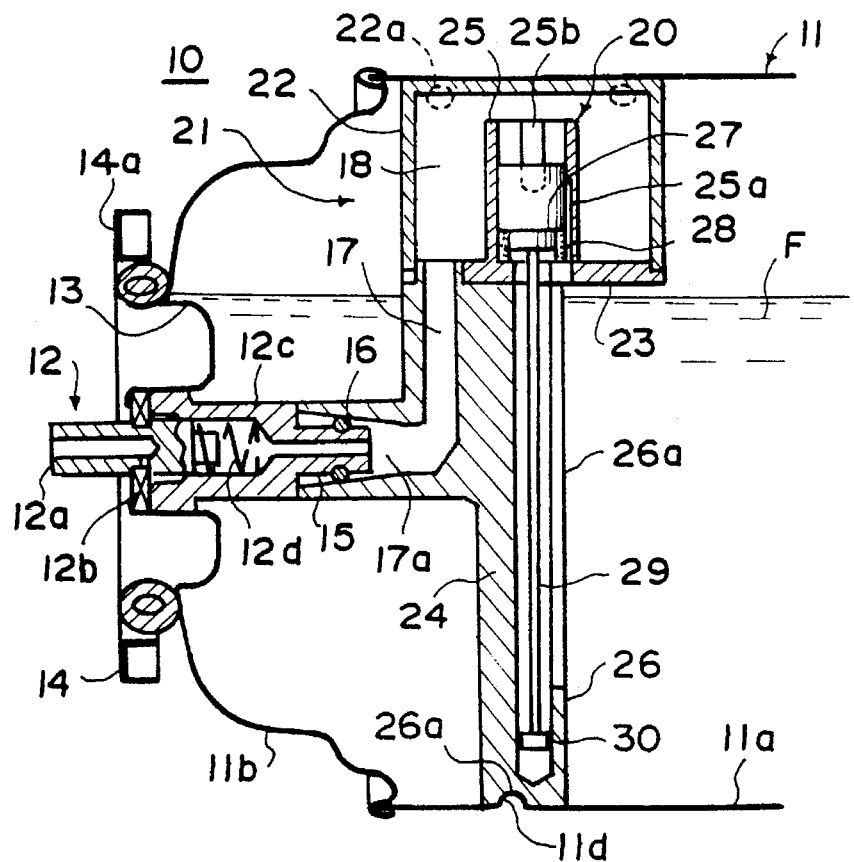
FIG. 30 is a cross sectional view showing chief elements of a cassette type gas cylinder according to a seventh embodiment of this invention.
Figure 31:
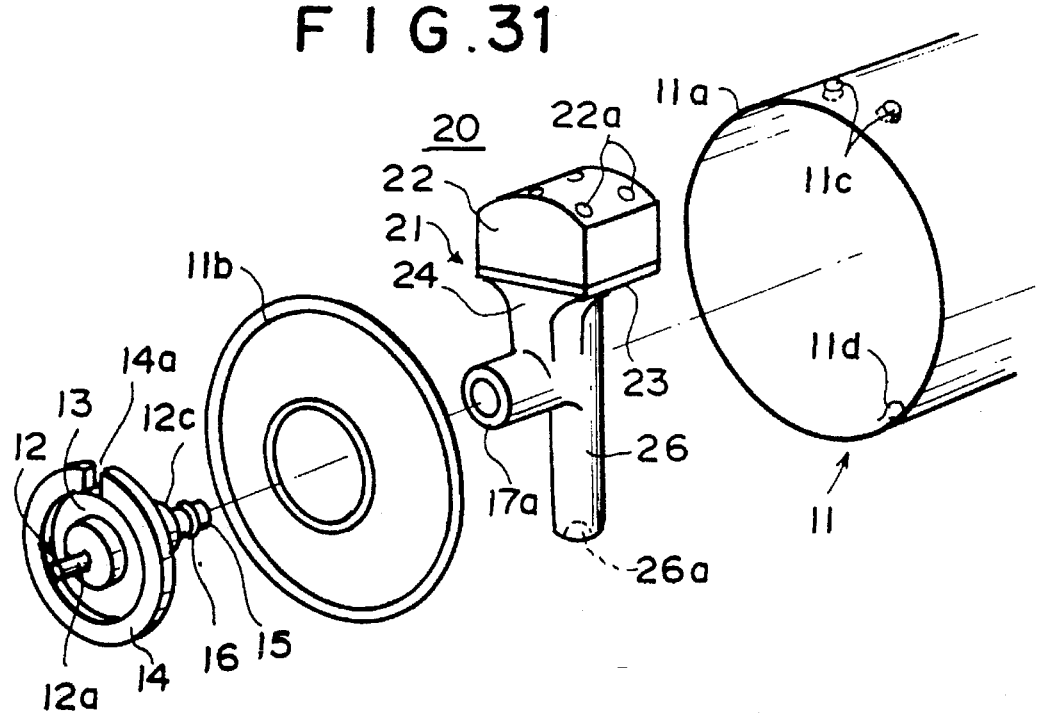
FIG. 31 is an exploded perspective view showing the cassette type gas cylinder shown in FIG. 30.

Seventh Embodiment:

FIG. 30 is a longitudinal cross sectional view showing a cassette type gas cylinder, and FIG. 31 is an exploded perspective view of the gas cylinder shown in FIG. 30.

A gas cylinder 10 includes a container 11 for containing liquefied fuel gas, and the container 11 is also made up of a cylindrical container body 11a, an annular top 11b formed on one end of the container body, and a lid 13 (a mounting cup) for closing the center of the top 11b (refer to FIG. 31). A valve 12 for opening and closing the discharge of liquefied gas contained in the container 11 is attached to the center of the lid 13.

This valve 12 has a conventionally known structure, in which a stem 12a is movably arranged in a fixed housing 12c by way of a valve seat 12b. The stem 12a is forced in the direction of projection by means of a spring 12d, and an internal aperture connected with a nozzle is closed by the rubber valve seat 12b. When the valve 12 is opened by forcing the stem 12a inwardly, evaporated gas is discharged. The lid 13 is also connected to an outwardly extended flange 14, and a nick-shaped indentation 14a is formed on one part of the flange 14 (on an upper part of the flange in the drawing).

A remaining volume alarm unit 20 is disposed inside the container body 11a, and is provided with a housing 21 fixed to the container body 11a. This housing 21 is also provided with a gas flow guide channel 17 for introducing evaporated gas inside the container body 11a. An outflow side end 17a of the gas flow guide channel 17 is axially extended along the center of the container body 11a to an inner end of the housing 12c of the valve 12.

Figure 33:
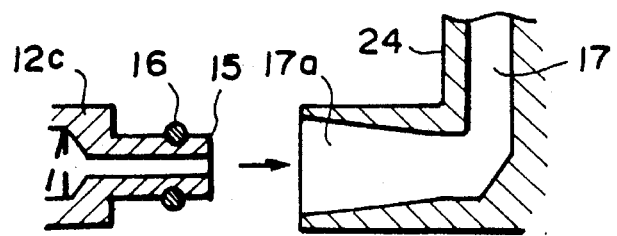
FIG. 33 is a partial cross sectional view showing the cassette type gas cylinder shown in FIG. 30 when it is being assembled.

The outflow side end 17a of the gas flow guide channel 17 is hermetically connected to the end of the casing 12c of the valve 12 when axially inserted to the end of the casing 12c. In practice, as shown in FIG. 33, an insert 15 with a small diameter is formed on the end of the casing 12c, and an O-ring 16 is attached to the surface of the insert 15. The internal surface of the outflow side end 17a of the gas flow guide channel 17 is tapered, and when the insert is fitted into the outflow side end, a gap between them is sealed with the O-ring 16.

The outflow side end 17a of the gas flow guide channel 17 is axially extended along the center of the container body 11a, and the other end of the guide channel is bent in the same direction as the nicked indentation 14a of the flange 14 is formed. This end of the guide channel is further extended radially, and connected to a gas chamber 18 formed within a housing 21.

The housing 21 is provided with the gas flow guide channel 17, the gas chamber 18, a cylinder section 25 which will be described later and a guide section 26. This housing is formed by molding a plastic material into several pieces; that is, a vessel 22 of the casing for surrounding the gas chamber 18 formed upwards and outwards, a bottom 23 of the casing which constitutes the cylinder 25 and the bottom of the gas chamber 18, and a connector section 24 which is extended downwards from the bottom 23 and also integrates the gas flow guide channel 17 and the guide section 26 with each other. These pieces are joined and integrated with each other.

The bottom of the vessel 22 is in the form of a rectangle, and a curved upper surface of the vessel is arranged so as to remain in contact with a wall of the container body 11a when the casing is mounted to the container. A couple of engaging recesses 22 are arranged on the front and rear portions of the upper surface. These engaging recesses 22a engage with a raised stopper section 11c of the container body 11a. The raised stopper section 11c is constituted of two protuberances. The vessel 22 is symmetrically formed so that it can be definitely engaged with the engaging section when mounted in any direction to the bottom 23. The bottom 23 is also provided with a bottom plate 23a which is arranged in parallel with the level of fuel to constitute the bottom surface of the gas chamber 18. A cylinder 25 longitudinally extended stands at the center of the bottom plate 23a, and an aperture 23b to which the gas flow guide channel 17 is connected is formed in front of the cylinder 25. An L-shaped passage which constitutes the gas flow passage 17 and the hollow guide 26 are integrated together inside the connector 24. A recessed engaging section 26a is formed on the end of the guide 26. This engaging section 26a engages with a raised stopper 11d of the container body 11a.

When the gas cylinder 10 is used, it is laid horizontally with the indentation 14a directed upwards. In this state, the gas chamber 18 of the housing 21 is situated in a gas space above the level of liquefied fuel F. When the valve 12 is opened, evaporated gas is discharged through the gas flow guide channel 17 having passed through the remaining volume alarm unit 20.

A piston-shaped vibrating hammer 27 is slidably inserted vertically in the cylinder 25 of the remaining volume alarm unit 20. A space higher than the hammer 27 is connected to the gas chamber 18, whereas a space lower than the hammer is connected to an internal space of the cylinder. The upper surface of the hammer 27 is subjected to a pressure inside the gas chamber 18, and the bottom surface is subjected to an internal pressure of the container body 11a. This vibrating member 27 moves up by means of the burst of contained gas. This vibrating member 27 produces a sound when the upper end thereof is caused to collide with the upper surface of the casing 22, that is, the wall of the container body 11a.

A ring-shaped resilient member 28 is attached to the bottom of the hammer 27, and this resilient member 28 projects itself from the lower end of the hammer 27, thereby supporting the hammer 27 floatingly. This resilient member 28 is constituted of a cylindrical cushion made of urethane foam or rubber or an O-ring cushion, and the resiliency and deformation of the resilient member 28 are determined by the adjustment of the material, and the thickness and height of the material.

An inflow passage 25a is formed at a lower position on the internal surface of the cylinder 25. This passage connects the gas chamber 18 to the inside of the container body 11a when the hammer 27 moves down compressing the resilient member 28 by a given amount. Also, outflow ports 25b are formed on an upper position on the internal surface of the cylinder 25, and these ports connect the gas chamber 18 to the inside of the container body 11a when the hammer 27 goes above by a predetermined level or more. The inflow passage 25a and ports 25b are axially formed on the inner surface of the cylinder 25, whereby the bottom 23 becomes easy to mold.

When the hammer 27 is in a free state, the lower ends of the outflow ports 25b on the side wall of the cylinder 25 are closed by the hammer 27. When the hammer 27 moves up, these ends, which are lower than the lower end of the hammer 27, are opened. In the meantime, when the hammer 27 is in a free state, the upper end of the inflow passage 25a is closed by the hammer 27. When the hammer 27 moves down against the resilient member 28, the end which is higher than the upper end of the hammer 27 becomes open.

A damping member 30 is connected to the hammer 27 by way of a coupling member 29. In other words, the lower end of the coupling member 29, with the upper end thereof fixed to the vibrating member 27, is extended through the bottom plate 23a inside the guide 26, which is cylindrically and longitudinally extended from the bottom plate, to the vicinity of an opposite end wall of the container body 11a which is kept away from the internal space of the container with the liquefied fuel laid therebetween. The piston-shaped damping member 30 for level detection which moves together with the hammer 27 is fixed to the lowermost end of the coupling member 29. A slit 26a is extended to the vicinity of the lower end on the side surface of the guide 26. Liquefied fuel can enter the inside of this guide, and the internal diameter of this guide 26 is set slightly larger than the outer diameter of the damping member 30.

The damping member 30 is subjected to resistance while moving in the liquefied fuel F inside the guide 26. This resistance is increased when the liquefied fuel passes through a gap between the damping body 30 and the guide 26. This provides the hammer 27 with resistance so that a speed of movement of the hammer 27 can be reduced. When the volume of remaining fuel is reduced, the damping member 30 travels in evaporated gas, and hence is subjected to lower resistance. This causes a deceleration effect on the hammer 27 to be reduced. When the volume of remaining liquefied fuel F is reduced to the predetermined level or less, the deceleration effect on the damping member 30 disappears, which in turn causes the hammer 27 to move freely and to collide with the wall of the container body.

The assembly of the gas cylinder 10 will now be described. First, as shown in FIG. 20, the top 11b and body 11a of the container 11, and the lid 13 to which the valve 12 is attached are produced separately from each other. The housing 21 is constituted by assembling the vessel 22, the bottom 23 and the connector 24 together. Also, the hammer 27 provided with the damping member 30 is attached to the housing 21, whereby the remaining volume alarm unit 20 is constituted. Then, the housing 21 is inserted into the container body 11a, and the engaging sections 22a and 26a formed on the upper and lower portions of the housing 21 engage with the stoppers 11c and 11d of the container body 11a, so that the housing 21 is fixed to the container body. At this time, the container body 11a is deformed by compressing the container body from its both sides so that the vertical length of the aperture can be increased. This facilitates the insertion of the housing 21 into the container body.

Subsequently, an open edge of the container body 11a and the outer periphery of the top 11b are joined together by crimping. The lid 13 is attached to the center aperture of the top 11b, and they are joined together by outwardly and extendedly crimping the outer edge of the lid 13. After the top 11b was joined to the container body 11a, the container body 11a becomes less susceptible to deformation, and the housing 21 is completely fixed to the container body 11a. Moreover, when the top 11b is attached to the lid 13, the insert 15 of the casing 12c of the valve 12 is fitted to the tapered inner surface of the outflow side end 11a of the gas flow guide channel 17, and they are easily and hermetically connected to each other by means of the O-ring 16 which is sandwiched between them. The gas cylinder is then filled with fuel gas from the valve 12.

Although the engaging recesses 22a, for fixing the housing 21 in position inside the container body 11a, and the stoppers 11c are shaped into a protuberance and a recess, respectively, an elongated engaging slot may be formed on the upper surface of the housing 21, and also a stopper in the form of a raised flange may be formed on the inner surface of the container body 11a. The stoppers 11c and 11c of the container body 11 are formed by a punching process before or after a metal plate is formed into a cylinder.

Figure 32:
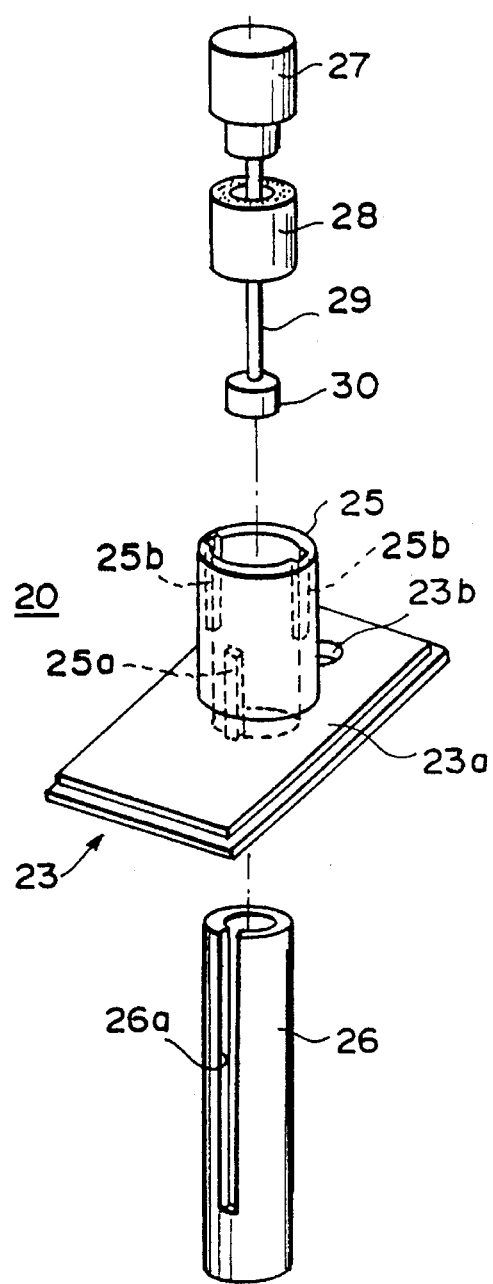
FIG. 32 is a partial exploded perspective view showing a remaining volume alarm unit shown in FIG. 30.

In the assembly of the housing 21, a cubic shape of the vessel 22 affords a directionality to the vessel 22 when it is joined to the bottom 23, whereby the engaging recesses 22a are put in position. However, the symmetrical arrangement of two couples of the engaging recesses 22a cancels the directionality of the vessel 22 when it is inserted into the container body. When the bottom of the vessel 22 is shaped into a rectangle having adjacent sides unequal (see FIG. 32), a difference in length between longer sides and shorter sides makes it easy for a machine to discriminate a longitudinal direction and a lateral direction of the vessel 22. Thereby, the automatic assembly of the vessel 22 to the bottom 23 and the housing 21 into the container body 11a by machines can be easily realized.

The operation of the remaining volume alarm unit according to this embodiment will not be described. When there is no discharge of gas contained in the cylinder, that is, in a state as shown in FIG. 30, the hammer 27 comes to rest at a lower position in the cylinder 25 while being supported by the resilient member 28. In this free state, the resilient member 28 is deformed in accordance with the weight of the hammer 27 (including weights of the coupling member 29 and the damping member 30). The vibrating member 27 locating at its lower position closes the passage outflow ports 25b and the inflow passage 25a, so that the gas flow guide channel 17 is disconnected from the internal space of the container. When there is no discharge of gas, and when the quantity of remaining fuel F is large, the damping member 30 is located deep in the liquefied fuel F as shown in FIG. 30. In accordance with the reduction of the volume of remaining fuel, the volume of liquefied fuel existing above the damping member 30 is reduced.

Figure 34:
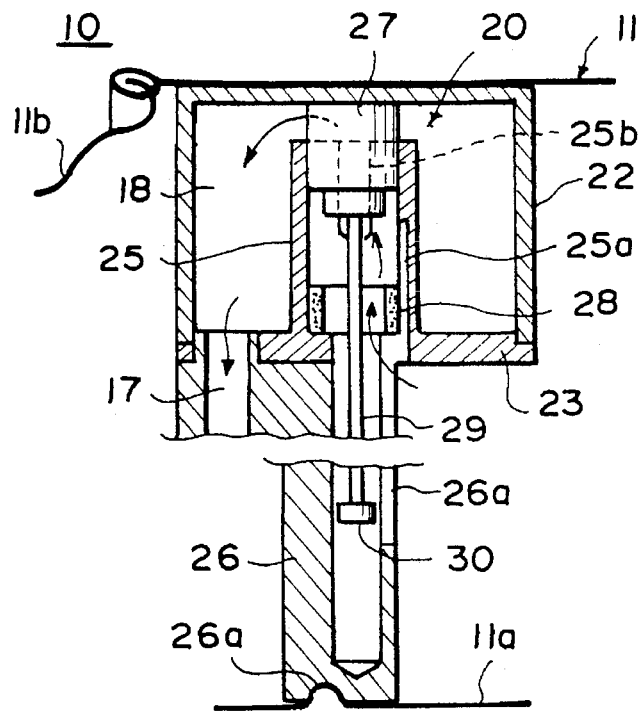
FIGS. 34 and 35 are cross sectional views showing chief elements of the remaining volume alarm unit, shown in FIG. 30, in an active state.

When gas is emitted by opening the valve 12, internal pressures of the gas flow guide channel 17 and the gas chamber 18 of the casing 21 drop, and this in turn causes a difference between pressures acting on the upper and lower sides of the hammer 27 to be increased, whereby force upwardly thrusting the hammer 27 is also increased. Then, the hammer 27 moves up along the cylinder 25 as shown in FIG. 34, and when the hammer 27 goes higher than the lower end of the outflow passages 25b, the gas flow guide channel 17 is connected with the internal space of the cylinder. Evaporated gas within the container 11 is emitted out of the valve 12, from the inside of the cylinder 25, by way of the outflow ports 25b, the gas chamber 18 and the gas flow guide channel 17.

When the volume of remaining fuel is large, the damping member 30 is subjected to large resistance, in spite of its small diameter, while moving in the liquefied fuel together with the rising of the hammer 27. This resistance causes the speed of movement of the hammer 27 to be decreased. Therefore, the upper end of the hammer 27 will not be caused to collide with the wall of the container body 11a, or will produce too small a sound to be recognized even when caused to collide with the wall.

When the liquefied fuel F is reduced to a predetermined level or less, the resistance to which the damping member 30 is subjected while moving in the liquefied fuel F is substantially reduced, and the decelerating effect on the hammer 27 resulting from the burst of gas contained is reduced almost to zero. Hence, the upper end of the hammer 27 forcefully collides with the wall of the container body 11a, thereby giving an alarm for the volume of remaining fuel.

When the outflow passages 25b are opened in conjunction with the elevation of the hammer 27, the liquefied fuel contained in the container body 11a is supplied via the gas flow guide channel 17, and then discharged from the valve 12 in the same manner as mentioned above. In association with the opening of the outflow passages 25b, the pressure difference upwardly thrusting the hammer 27 is canceled, and the hammer 27 moves down under its own weight after having collided with the wall of the container body. This causes the outflow passages 25 to be closed again, thereby interrupting the supply of gas. Further emission of gas from the gas flow guide channel 17 causes a pressure inside the gas flow guide channel to be substantially reduced to the atmospheric pressure, which in turn causes a difference between pressures acting on the upper and lower sides of the hammer 27 to be increased in the same manner as before. Thus, the hammer 27 is upwardly thrust again, and then produces a sound when colliding with the wall of the cylinder.

Such vertical movements of the hammer 27 recur during the discharge of gas, and the collision sounds directly travel as an alarm through the cylinder wall to the outside, whereby users can clearly realize the reduction of the volume of remaining fuel. At this time, as will be described in detail, capacities of the gas chamber 18 and the gas flow guide channel 17, i.e., a capacity of the casing is small, the speed of variation of the pressure in these sections is greatly increased, and hence the movements of the vibrating member 27 cannot follow these pressure variations. Alarm operations are ensured by setting the size of the gas chamber 18 to a predetermined value.

While collision sounds are being produced by the vertical movements of the hammer 27, the flow of gas discharged from the gas cylinder 10 through the valve 12 becomes a pulsating flow. In a commonly used gas apparatus, a gas pressure regulator valve (governor) is interposed between a cylinder connector and a burner. Therefore, even if the gas flow becomes a pulsating flow as mentioned above, the supply of gas to the burner is smoothed by this gas pressure regulator valve. This ensures that normal combustion of the burner continues, and hence the remaining volume alarm unit 20 is not affected by the pulsating flow.

Figure 35:
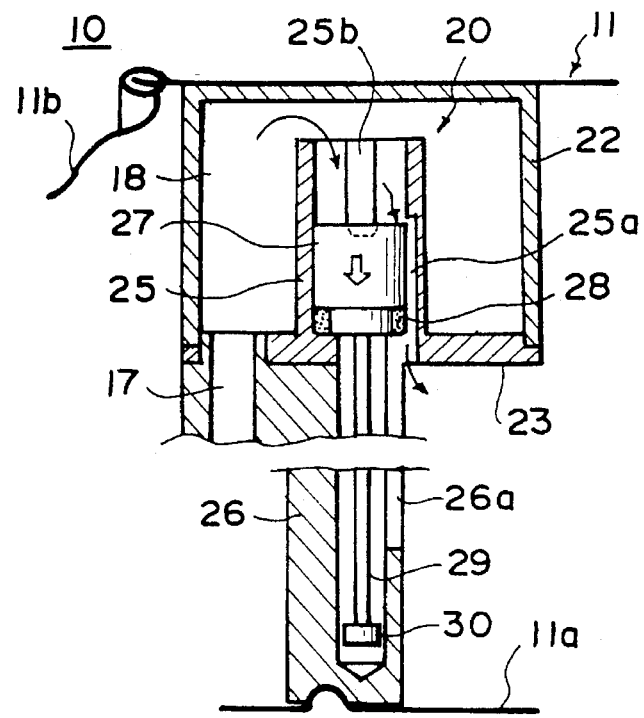

When the cylinder 10 is filled with gas, or when a temperature of the gas flow guide channel 17 becomes higher while the guide channel 17 remains disconnected from the internal space of the cylinder, then a pressure of the gas flow guide channel rises, the hammer 27 is forced down as shown in FIG. 35, and the hammer 27 further moves down deforming the resilient member 28 downwardly. When the upper end of the hammer 27 causes the upper end of the inflow passage 25a to be opened, the gas chamber 18 is connected with the internal space of the cylinder, and hence degassing is effected, wherein high pressure gas in the gas chamber 18 enters the internal space of the cylinder via the inflow passage 25a. This prevents gas from escaping from the cylinder.

Even when the outflow ports 25b are closed, the hammer 27 does not produce a collision sound unless a pressure difference caused by the discharge of gas occurs. When the gas cylinder 10 or a gas apparatus equipped with this cylinder is not used, and when the attitude of the container 11 is not horizontally arranged, no alarm is given, and hence the issue of an alarm resulting from erroneous operations of the alarm unit is avoided.

Figure 36:
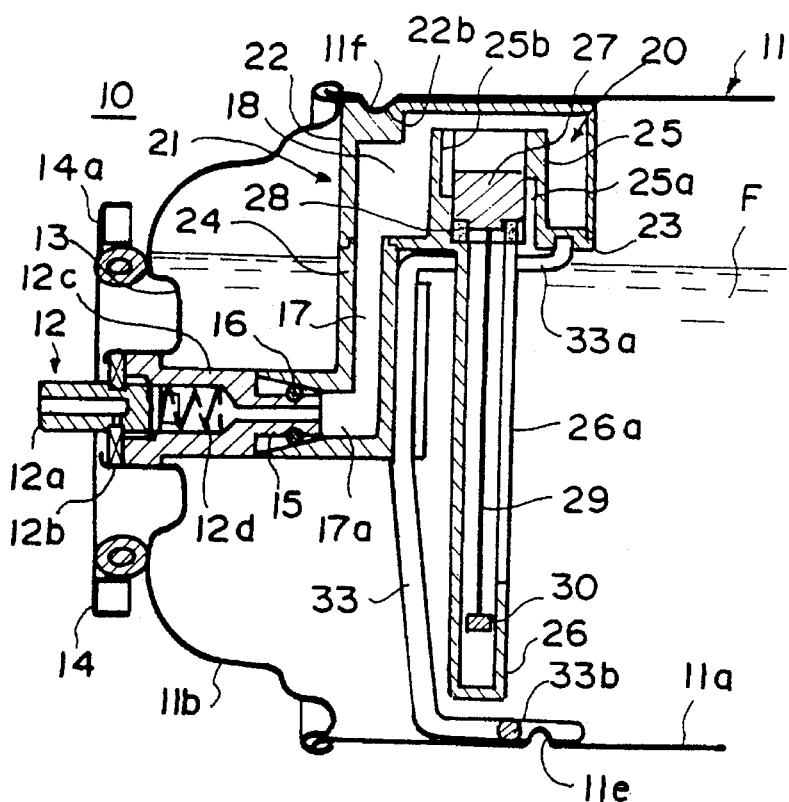
FIG. 36 is a cross sectional view showing chief elements of a modified example of the cassette type gas cylinder.
Figure 37:
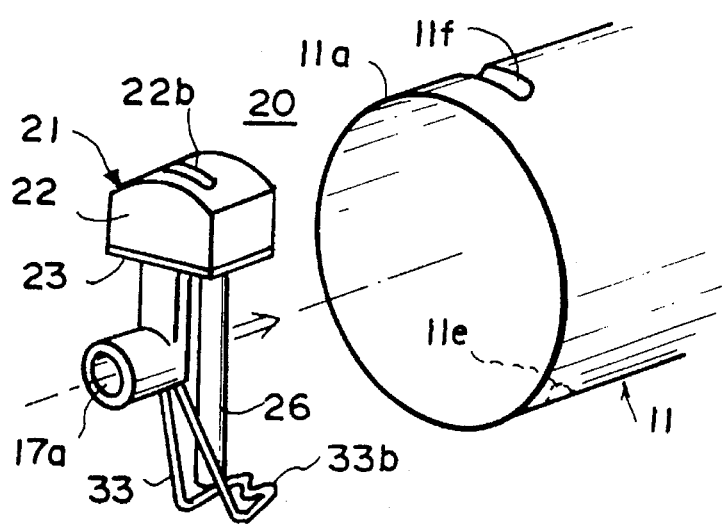
FIG. 37 is a perspective view showing assembly processes of the gas cylinder shown in FIG. 36.

FIGS. 36 and 37 show a modified example of the housing 21 having a different structure for fixing the housing to the container body 11a. This example differs slightly from the previous embodiment in structure, but the same reference numerals are provided to designate corresponding features of the previous embodiment. In this example, the housing 21 is fixed by means of a wire-shaped spring member. A recessed slot-shaped engaging section 22b is formed on the upper surface of the vessel 22 of the housing 21, and this engaging section 22b engages with a raised flange-shaped stopper 11f of the container body 11. The lower end of the guide 26 is not long enough to reach the wall of the container body 11a, and the lower end of a spring member 33, with the upper end 33a thereof connected to the housing 21, is bent into an engaging section 33b. This engaging section 33b engages with a raised stopper 11e on the internal surface of the container body 11a, and the housing 21 is upwardly forced under the resilience of the spring member 33, whereby the casing 21 is attached to the container body. The other components of the gas cylinder of this example are the same as those of the previous embodiment. The same reference numerals are provided to designate the corresponding features of the previous embodiment.

Figure 38:
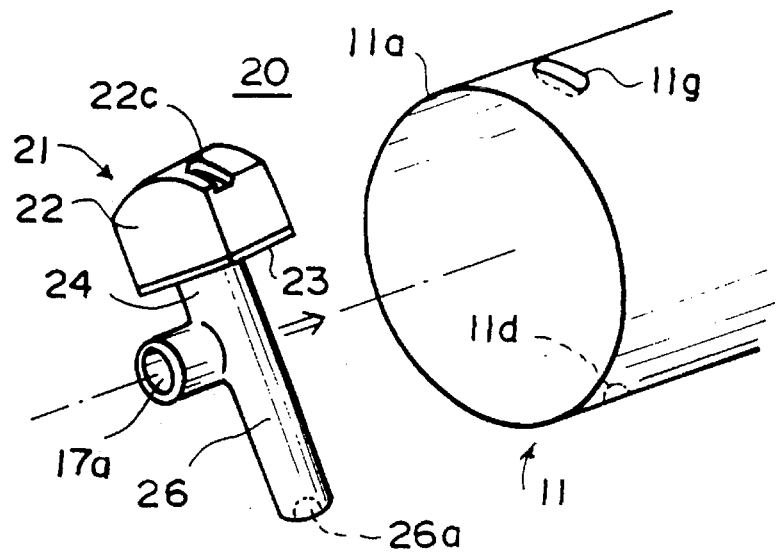
FIG. 38 is a perspective view showing assembly processes of a second modified example of the cassette type gas cylinder shown in FIG. 36.

In another modified example shown in FIG. 38, a bow-shaped engaging slot 22c is formed, extended from one side to an intermediate position on the upper surface of the housing 21. A raised stopper 11g which engages with this engaging slot is also formed on the container body 11a. Moreover, as with the example shown in FIG. 30, the lower end of the guide 26 is provided with an engaging section 26a. When the housing 21 is fixed to the container body 11a, the engaging section 26a is first engaged with the stopper 11d of the container body 11a, and then the stopper 11g of the container body 11a is fitted into the engaging slot 22c by turning the upper portion of the casing round after the engaging section 26a is engaged with the stopper 11d of the container body 11a.

Figure 39:
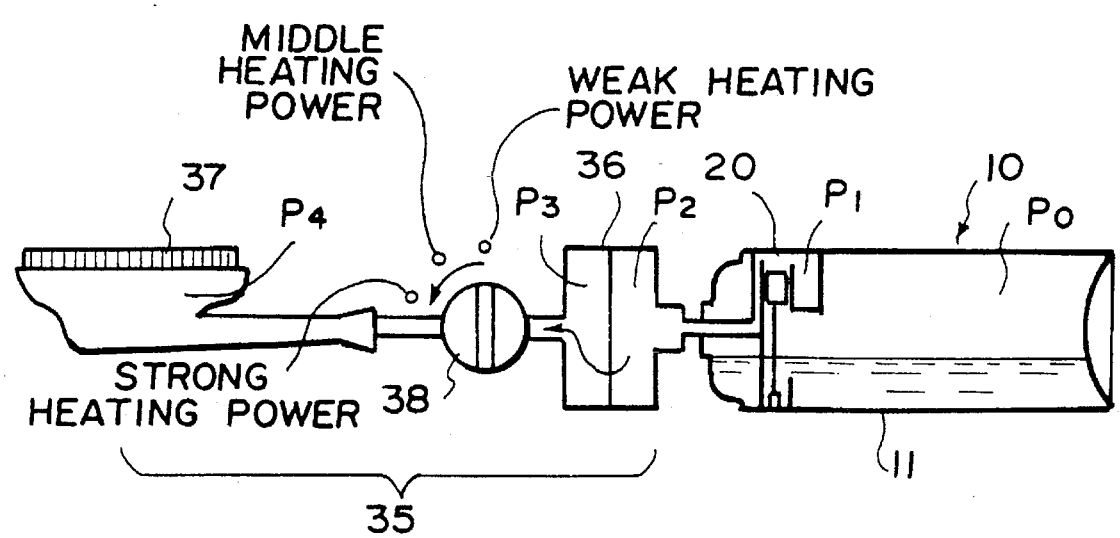
FIG. 39 is a schematic arrangement view showing a gas flow channel when a cassette type gas cylinder is set into a portable heater.

The operation of such a cassette type gas cylinder 10 will now be described in detail. A gas flow channel when the above-mentioned gas cylinder 10 is set into a portable gas heater 35 is shown in FIG. 39. Gas supplied from the gas cylinder 10 undergoes a gas pressure regulation by a governor 36 of the cassette gas heater 35, and it is then supplied to the burner 37. A cock 38 interposed between the governor 36 and the burner 37 regulates a heating power stepwise in the order of weak, middle and strong.

Liquefied gas inside the gas cylinder 10 evaporates when the cock 38 is opened, and evaporated gas is supplied to the governor 36. Provided that a pressure of gas supplied from the gas chamber 18 inside the gas cylinder 10 is P1, then a pressure of gas on the primary side of the governor 36 is P2, a pressure of gas on the secondary side of the governor 36 is P3 and a pressure of gas of the burner 37 is P4. A relationship between these pressures will now be described. A pressure at an open end of a gas outlet of the burner 37 is the atmospheric pressure. Gas flows from the secondary side of the governor 36 through the cock 38 at a regulated constant pressure P3. In this governor 36, the gas pressure P3 on the secondary side is constantly regulated even when the gas pressure P2 on the primary side varies. The gas pressure P2 on the primary side of the governor 36 is determined by the pressure P1 inside the gas chamber 18 of the gas cylinder 10 and the internal pressure P0 of the gas cylinder.

An initial gas pressure of the internal pressure P0 of the cylinder is determined by a temperature of the gas cylinder 10. Liquefied fuel gas evaporates when the cock 38 is opened, and a necessary amount of gas is supplied to the burner 37 via the governor 36. During this time, the gas cylinder 10 is cooled, and its temperature is reduced due to latent heat produced by the evaporation of liquefied gas. When the temperature of the gas cylinder 10 drops below an ambient temperature, the gas cylinder is supplied with heat from its surroundings. Thus, the temperature of the gas cylinder 10 varies until it achieves thermal equilibrium.

Therefore, the internal pressure P0 of the cylinder drops from its initial gas pressure until the gas cylinder achieves thermal equilibrium. In accordance with variations in this internal pressure P0 of the cylinder, the pressure P1 inside the gas chamber varies, which in turn causes the gas pressure P2 on the secondary side of the governor 36 to change. In order to obtain a flow rate of gas required by the burner 37, when the gas pressure P2 on the primary side is higher than the gas pressure P3 on the secondary side of the governor 36, combustion remains continued at a predetermined heating power. However, when the gas pressure P2 on the primary side of the governor 36 is lower than the gas pressure P3 on the secondary side, the supply of gas to the burner 37 is reduced.

After the use of the burner 37 with the cock 38 closed, when the temperature of the governor 36 is higher than that of the gas cylinder 10, the gas pressure P2 on the primary side of the governor 36 becomes higher than the internal pressure P1 of the cylinder, so that gas on the primary side of the governor 36 inversely flows into the gas cylinder 10 under a reversed pressure as previously mentioned.

The capacities of the gas chamber 18 and the gas flow guide channel 17 of the housing 21 in the remaining volume alarm unit 20, that is, the capacity of the casing affects the actuation of the hammer 27. In practice, as mentioned before, the discharge of gas from the gas cylinder 10 causes the pressure P1 inside the gas chamber to drop, and hence a sufficient difference arises between the pressure P1 and the internal pressure P0 of the cylinder. Also, only when the capacity of the casing is appropriately set, the hammer 27 forcefully collides with the wall of the container body, thereby giving an alarm for the quantity of remaining fuel. As conditions for actuating the hammer 27 to give an alarm, following two conditions must be satisfied.

First Condition: the damping member 30 is exposed from the level of liquefied fuel inside the gas cylinder 10, and Second Condition: the temperature of the gas cylinder drops due to latent heat resulting from the supply of gas from the gas cylinder 10, and an equilibrium gas pressure P0 (the pressure inside the gas chamber) drops below a hammer actuation start pressure.

Figure 40:
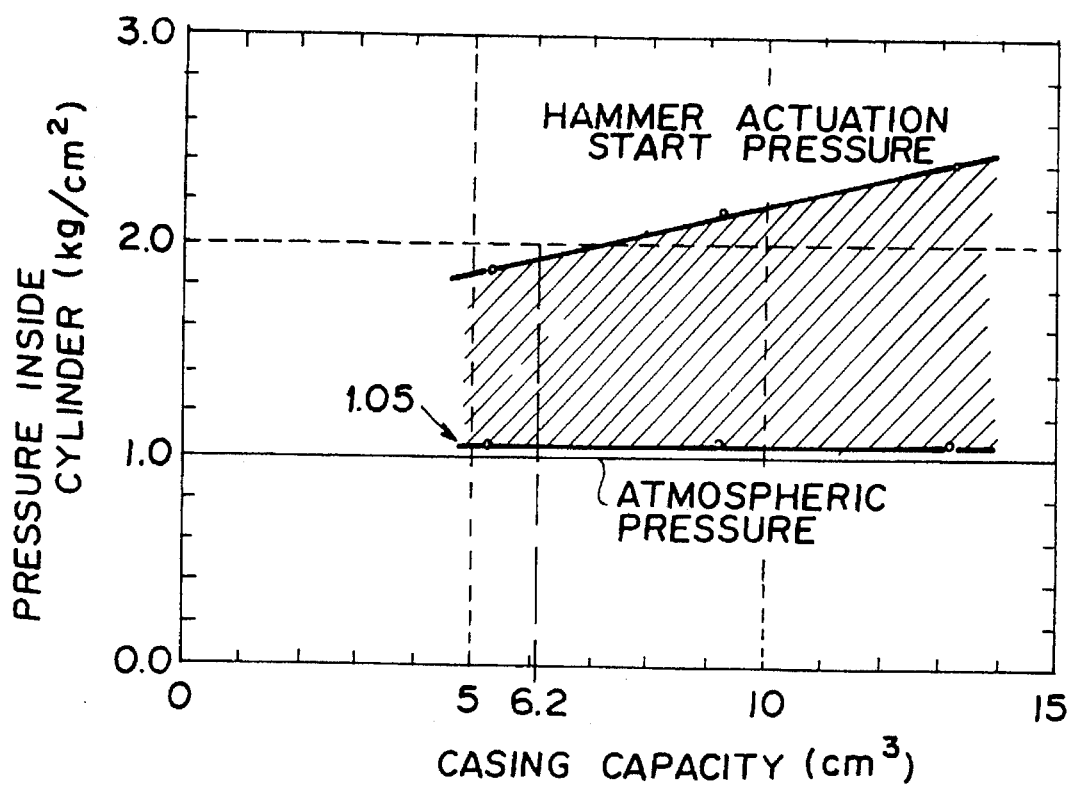
FIG. 40 is a plot showing a relationship between the volume of a casing of a remaining volume alarm unit and a pressure which starts the actuation of hammer.

The first embodiment only requires that the damping member 30 be exposed to evaporated gas. This is only determined by a relationship between a lowermost position of the damping member 30 and a lowermost position of the slot 26a of the guide 26. With regard to the second condition, a result measured from an experiment is shown in FIG. 40. The hammer 27 used in this experiment has a diameter of 6 mm, a height of 6 mm and a weight of 2 g.

When the internal pressure P0 of the cylinder under the second condition is in the region defined by oblique lines with the first condition satisfied, the hammer 27 starts driving to give an alarm. When the capacity of the casing is increased, the hammer actuation start pressure also rises, so that the hammer is actuated when the temperature of the gas cylinder 10 is an ambient temperature. When the capacity of the housing 21 is decreased by reducing the size of the remaining volume alarm unit 20, the actuation start pressure of the hammer 27 is lowered. The temperature of the gas cylinder also drops due to latent heat produced by the evaporation of discharged gas. Hence, no alarm is given unless the equilibrium gas pressure P0 goes below the alarm start pressure.

As a result of the outflow of gas from the gas cylinder 10, the hammer 27 is vertically moved by a difference between the pressures P1 inside the gas chamber and the internal pressure P0 of the cylinder, and the pressures P0 and P1 constantly act so that they can be equalised. In this case, in order to cause the hammer 27 to move, the capacity of the casing must be appropriately ensured, and also a sufficient volume of evaporated gas to cause the hammer 27 to collide against the upper wall must be discharged into the casing from the inside of the cylinder.

Assume that flow rates of gas under the pressures P0 to P4 are V0–V4, respectively. The governor 36 is operated so that a product P2V2 of the gas pressure P2 and a gas flow rate V2 can be kept continually constant even when the gas pressure P2 on the primary side varies. An amount P0V0 of gas corresponding to the amount P2V2 of gas which is constantly supplied to the burner 37 is intermittently discharged into the gas chamber 18 within the vessel 22 from the internal space of the gas cylinder in response to the capacity of the casing by vertical movements of the hammer 27. A volume V0 of gas discharged by one movement of the hammer 27 is in proportion to the capacity of the casing. The more the volume V0 of gas discharged by one movement of the hammer is increased, the higher the speed of movement of the hammer.

The temperature of the gas cylinder drops by a latent heat of evaporation produced by the discharge of gas, and hence the equilibrium gas pressure P0 also drops. Assume that the gas flow rate P0V0 at one time is constant, the volume V0 of gas supplied to the governor 36 is increased. Since the hammer 27 is actuated in response to this, this hammer 27 causes actuation when the volume V0 of discharged gas is large. The internal pressure P0 of the cylinder differs at ambient temperatures in which the gas cylinder 10 is disposed.

Figure 41:
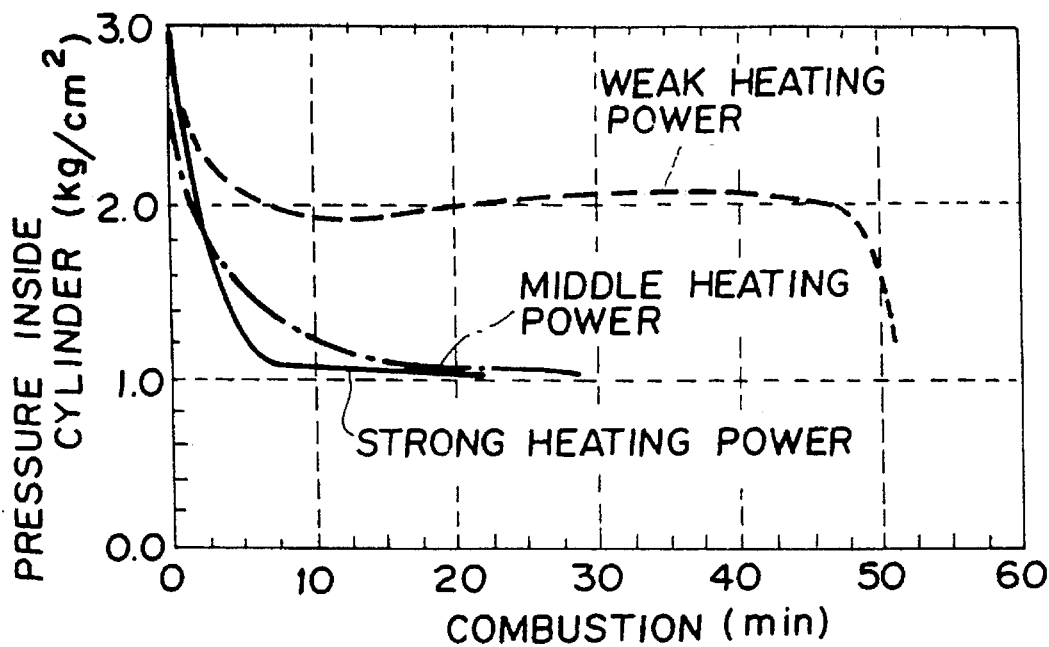
FIG. 41 is a plot showing a relationship between a combustion time and an internal pressure of a cylinder since fuel becomes reduced.

For example, FIG. 41 shows variations in internal pressure of the cylinder when combustion is continuously effected with a strong flame (a gas flow rate of 1.75 g/min.), a middle flame (a gas flow rate of 1.55 g/min.) and a weak flame (a gas flow rate of 0.80 g/min.) under conditions in which an amount of gas is 40 g and a surrounding temperature is 20 degrees Centigrade. With a strong or middle flame, the internal pressure immediately drops to approximately the atmospheric pressure. Meanwhile, the internal pressure becomes stable with a weak flame at a pressure higher than the atmospheric pressure, but sharply drops after the completion of combustion. At this time, the lower the surrounding temperature becomes, the more immediately the internal pressure drops.

As a result of this, when the combustion is effected with a strong or middle flame, a drop in internal pressure is large, and the internal pressure drops below the hammer actuation start pressure in the middle of the combustion. When the combustion is effected with a weak flame, the cooling of the gas cylinder 10 due to a latent heat of evaporation and the supply of heat from surroundings are balanced with each other. In an example shown in FIG. 42, a thermal equilibrium is attained at an internal pressure of 2.0 kg/cm$^2$ and a cylinder surface temperature of 15 degrees Centigrade, and the combustion remains over a long time. When the capacity of the casing satisfies the oscillation conditions, alarm sounds are continuously produced during this period of thermal equilibrium. In order to avoid this, the capacity of the casing is reduced, or the position of the damping member 30 is lowered so that the quantity of remaining liquefied fuel, at which the issue of alarm is started, can be reduced.

When the ambient temperature is much higher, and the heating power is weak, the internal pressure of the cylinder may not drop below the hammer actuation start pressure. Even in this case, during the few minutes during which the quantity of remaining gas comes to an end, the internal pressure of the gas cylinder goes below the hammer actuation start pressure, and an alarm is given.

Gas which is a mixture of propane, isobutane, normal butane, isopentane, or thereabouts, may be used to fill the gas cylinder 10. These gases are different from each other in boiling point, vapor pressure, latent heat of evaporation and specific heat, so the composition of liquefied gas remaining in the gas cylinder 10 may differ from its original composition in ratio. In other words, constituent gas specific to each vapor pressure is discharged from the liquefied gas remaining in the gas cylinder 10 depending on a temperature. The temperature of the remaining liquefied gas is an ambient temperature at first. However, the remaining liquefied gas is cooled by a latent heat of evaporation in accordance with the discharge of gas, whilst the gas cylinder 10 is heated by an ambient temperature or heat transferred from the cassette type heater 35. These temperatures vary while being equalised with each other at each time. The compositional ratio of evaporated gas to be discharged varies in accordance with temperatures of the remaining liquefied gas. Any compositions possessing a lower boiling point and a low vapor pressure are first discharged, and hence the composition of the liquefied gas remaining in the gas cylinder is varied from its original composition with time. From an obtained result, it turns out that no significant difference in variable characteristic of the pressure inside the gas cylinder due to these compositional variations is observed.

Figure 42:
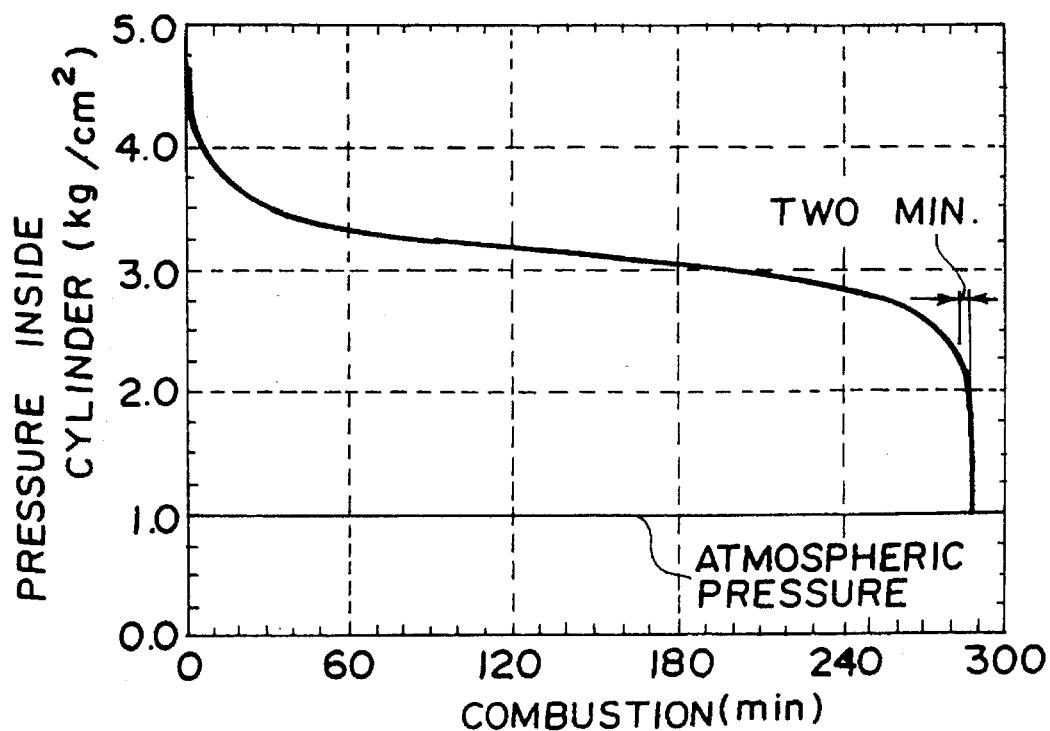
FIGS. 42 to 44 are plots showing measured results of a relationship between an elapsed combustion time and an internal pressure of a cylinder by varying the conditions of ambient temperature and gas flow rate.

In the remaining volume alarm unit 20 having a practical design size, the capacity of a practical casing is 6.2 cm$^3$, and this casing has a hammer actuation start pressure of about 2.0 kg/cm$^2$ when compared with the hammer actuation characteristic shown in FIG. 40. FIG. 42 shows variations in pressure inside the gas cylinder when the combustion of the cassette type heater 35 is continuously effected with a weak flame (a gas flow rate of 0.8 g/min.) at an ambient temperature of 40 degrees Centigrade until the gas cylinder 10 filled with gas of 250 g in weight is exhausted to zero. In this case, the internal pressure of the gas cylinder drops below 2.0 kg/cm$^2$ two minutes before the volume of gas becomes zero. Hence, a period of resulting alarm is relatively short.

Figure 43:
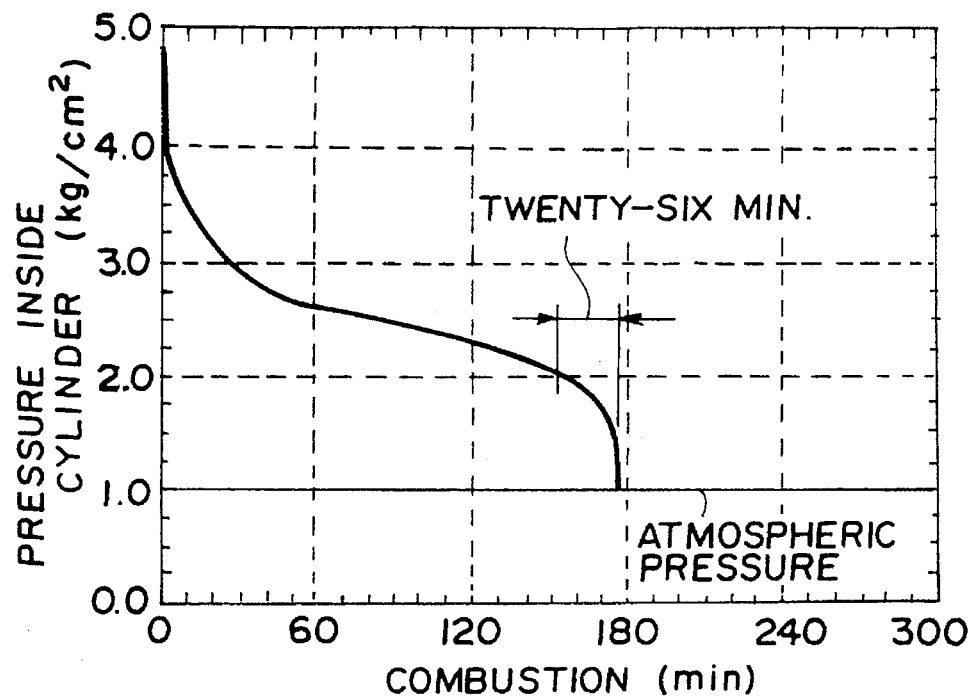

FIG. 43 shows variations in pressure inside the gas cylinder when the combustion of the cassette type heater 35 is continuously carried out at the same temperature as the previous example, that is, a temperature of 40 degrees Centigrade with a middle flame (a gas flow rate of 1.4 g/min.). In this case, the internal pressure of the cylinder goes below 2.0 kg/cm$^2$ twenty six minutes before the volume of gas becomes zero. The increase of the volume of gas discharged causes the internal pressure of the gas cylinder to drop, whereby an alarm issuing time becomes longer.

Figure 44:
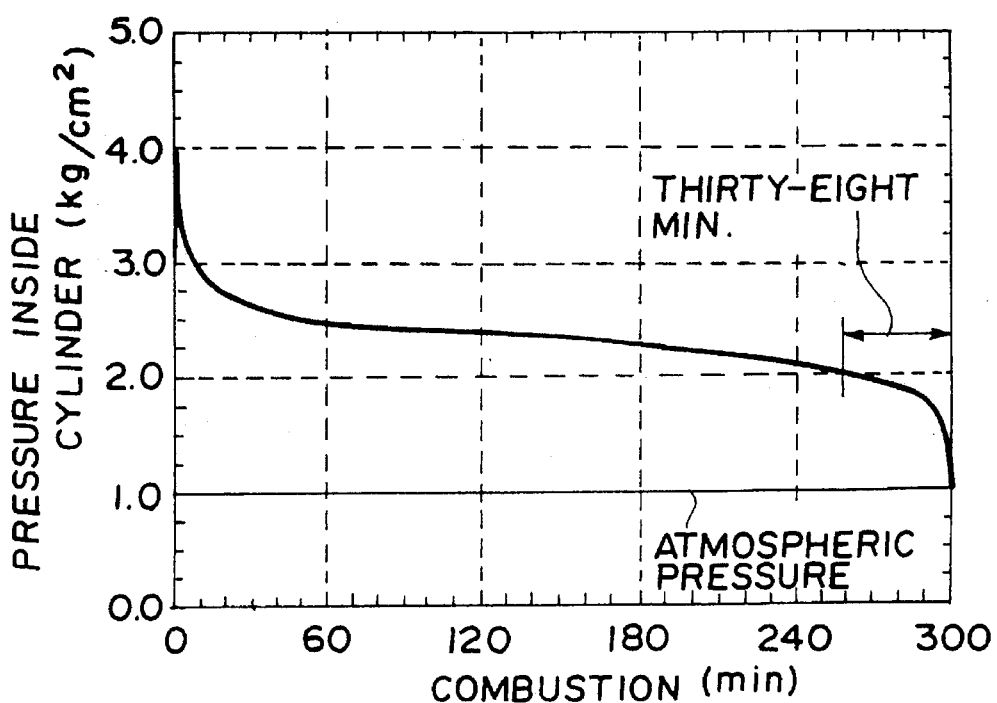

FIG. 44 shows variations in pressure inside a gas cylinder when the combustion of the cassette type heater 35 is continuously carried out at an ambient temperature of 30 degrees Centigrade with a weak flame (a flow rate of 0.8 g/min.). In this case, the internal pressure of the gas cylinder goes below 2.0 kg/cm$^2$ thirty eight minutes before the volume of gas becomes zero. A drop in ambient temperature causes the internal pressure of the gas cylinder to drop, whereby an alarm issuing time becomes longer. Here, in order to reduce a period of alarm, the detecting position of the damping member 30 is set to a lower position.

When the remaining volume alarm unit 20 incorporated into a practical gas cylinder 10 is designed, the size of each component and working conditions of components are determined allowing for the above mentioned matters.

According to the cassette type gas cylinder of this embodiment, a housing which constitutes a remaining volume alarm unit is disposed inside a container body, and this housing is fitted to a valve provided on a lid. Thus, the gas cylinder with such an alarm unit is superior in assembling characteristics. The remaining volume alarm unit is compactly made up of component parts, that is, a gas chamber, a cylinder, a hammer, a resilient member and a damping member. Particularly, the damping member is slidably arranged inside a cylindrical guide, whereby the damping member can provide, in spite of its small diameter, the hammer with large resistance while moving in liquefied fuel. This leads to a more compact alarm unit. Also, the hammer collides with the wall of the container body in accordance with the outflow of gas contained, and this collision sound can be definitely recognized from the outside as an alarm indicating the reduction of remaining fuel. Therefore, it becomes possible to prevent unforeseeable exhaust of fuel.

Moreover, burst energy of the fuel gas contained is utilized to produce an alarm sound, and hence the gas cylinder of this invention requires no dedicated battery for such an purpose. This makes the structure of the gas cylinder simple, and also prevents an alarm from being given as a result of erroneous operations of the alarm unit when the gas cylinder is not set in a gas apparatus, thereby ensuring a high reliability in operation.

We claim:

1. A method for manufacturing a cassette type gas cylinder provided with a container for containing liquefied fuel gas, which is made up of a cylindrical container body, an annular top to be joined to one end of said container body and a lid to be joined to the center aperture of said top, and a valve fixed to the center of said lid for controlling the discharge of the liquefied fuel gas, said method comprising the steps of:

disposing a gas flow channel with one end thereof insertably fitted into the inner end of said valve in the axial direction and with the other end thereof extended upward into a gas space formed above the fuel level of said container body laid horizontally;

disposing a casing which is connected to the end of said gas flow channel for housing a remaining volume alarm unit which gives an alarm when the volume of remaining liquefied fuel is reduced to a predetermined level or less, and the outer surface of said casing being cylindrically shaped so as to be fitted along the inner surface of said container body and also joined to a radially extended supporting member;

inserting said casing to which the gas flow channel is fixed into said container body;

fixedly putting said casing in position inside said container body with said supporting member; and assembling said gas cylinder by fitting the end of said valve with the end of said gas flow channel when said lid is attached to said top after said container body and said top are joined together.

2. A cassette type gas cylinder comprising:

a container for containing liquefied fuel gas;

a valve means positioned on one end of said container for controlling the discharge of the fuel;

a gas flow channel means with one end thereof connected to the inner end of said valve means and with the other end thereof opened into a gas space formed above the level of the fuel when said gas cylinder is laid horizontally;

a movable vibrating member disposed in said gas flow channel means for producing a sound when vibrated and caused to collide with a body by the burst of the fuel gas; and a damping means connected to said vibrating member by means of a coupling member, and located below a predetermined level of the liquefied fuel gas, whereby said damping means suppresses the production of a collision sound made by said vibrating member by providing the vibrating member with resistance when the level of the liquefied fuel is above said predetermined level, but does not suppress the production of the collision sound when the level of the liquefied fuel is below said predetermined level.

3. A cassette type gas cylinder as defined in claim 2, further comprising:

a casing connected to said gas flow channel means; and a cylinder having a connecting hole arranged inside said casing, in which said vibrating member is slidably fitted in said cylinder with one end surface of said vibrating member being subjected to an internal gas pressure of said container; said connecting hole formed so as to be closed by said vibrating member when said vibrating member is situated at a descended position, whereby the movement of said vibrating member is brought about by the increase of a difference between pressures acting on both sides of said vibrating member when said connecting hole is closed in response to a pressure drop occurring in said gas flow channel means resulting from the opening of said valve, and the speed of movement of said vibrating member depends on the position of said damping means with respect to said predetermined level.

4. A cassette type gas cylinder as defined in claim 3, wherein said vibrating means is in the form of a piston.

5. A cassette type gas cylinder as defined in claim 3, further comprising:

a resilient member for supporting the weight of said vibrating member when said gas flow channel means is disconnected from an internal space of said cylinder by said vibrating member; and a port which opens when said vibrating member is moved displacing said resilient member, so that the gas flow channel means is connected to an internal space of said cylinder.

6. A cassette type gas cylinder as defined in claim 5, wherein said resilient member is made up of a coil spring sandwiched between said vibrating member and a bottom of said casing.

7. A cassette type gas cylinder as defined in claim 6, wherein said coupling member is made of a flexible material.

8. A cassette type gas cylinder as defined in claim 2, further comprising:

a resilient member for supporting the weight of said vibrating member when said gas flow channel means is disconnected from an internal space of said cylinder by said vibrating member; and a port which opens when said vibrating member is moved displacing said resilient member, and then said gas flow channel means is connected with the internal space of said cylinder.

9. A cassette type gas cylinder as defined in claim 8, wherein said resilient member is made up of a coil spring sandwiched between said vibrating member and a bottom of said casing.

10. A cassette type gas cylinder as defined in claim 9, wherein said coupling member is made of a flexible material.

11. A cassette type gas cylinder comprising:

a container for containing liquefied fuel gas;

a valve means positioned on one end of said container for controlling the emission of the fuel;

a gas flow channel means extended from one end thereof, connected to the inner end of said valve means, to the other end thereof opened into a gas space formed above the level of the fuel when said gas cylinder is laid horizontally;

a movable vibrating member disposed in said gas flow channel means for producing a sound when vibrated and caused to collide with a body by the burst of the fuel gas;

a link mechanism connected to said vibrating member by means of a coupling member, and made up of said coupling member and a floating member; and said floating member which moves in accordance with the volume of liquefied fuel remaining in said container and located below a predetermined level of the liquefied fuel gas, whereby said floating means suppresses the production of a collision sound made by said vibrating member by providing the vibrating member with resistance when the level of the liquefied fuel is above said predetermined level, but does not suppress the production of the collision sound when the level of the liquefied fuel is below said predetermined level.

12. A cassette type gas cylinder as defined in claim 11, further comprising:

a cylinder having a connecting hole arranged in said gas flow channel means, in which said vibrating member is slidably fitted in said cylinder with one end surface of said vibrating member being subjected to an internal gas pressure of said container; and said connecting hole formed so as to be closed by said vibrating member;

whereby said vibrating member closes said connecting hole in response to the movement of said floating member occurring when the liquefied fuel is reduced to said predetermined level or less, and the closing of said connecting hole brings about the increase of a difference between pressures acting on both sides of said vibrating member, so that said vibrating member is moved and caused to collide with a body by the burst of the fuel gas.

13. A cassette type gas cylinder comprising:

a container, for containing liquefied fuel gas, which is made up of a cylindrical container body, an annular top to be joined to one end of said container body and a lid to be joined to the center aperture of said top;

a valve fixed to the center of said lid for controlling the discharge of the liquefied fuel gas;

a gas flow channel with one end thereof insertably fitted into the inner end of said valve in the axial direction and with the other end thereof extended upward into a gas space formed above the fuel level of said container body laid horizontally;

a casing connected to the end of said gas flow channel for housing a remaining volume alarm unit which gives an alarm when the volume of remaining liquefied fuel is reduced to a predetermined level or less, and the outer surface of said casing being cylindrically shaped so as to be fitted along the inner surface of said container body and also joined to a radially extended supporting member; and said supporting member for fixedly placing said casing to which said gas flow channel is firmly attached in position inside said container body, wherein the inner end of said valve is fitted to the end of said gas flow channel after said container body is joined to said top but before said lid is attached to said top.

14. A cassette gas cylinder as defined in claim 13, wherein said remaining volume alarm unit is provided with a movable vibrating member for producing a collision sound when vibrated and caused to collide with a body by the burst of gas; and a damping means connected to said vibrating member by means of a coupling member, and located below said predetermined level of the liquefied fuel gas, whereby said damping means suppresses the production of a collision sound made by said vibrating member by providing said vibrating member with resistance when the level of the liquefied fuel is above said predetermined level, but does not suppress the production of the collision sound when the level of the liquefied fuel is below said predetermined level.

15. A cassette type gas cylinder comprising:

a container, for containing liquefied fuel gas, which is made up of a cylindrical container body, a annular top to be joined to one end of said container body and a lid to be joined to the center aperture of said top;

a valve fixed to the center of said lid for controlling the discharge of the liquefied fuel gas;

a gas flow channel with one end thereof insertably fitted into the inner end of said valve in the axial direction and with the other end thereof extended upward into a gas space formed above the fuel level of said container body laid horizontally;

a casing connected to the end of said gas flow channel for housing a remaining volume alarm unit which gives an alarm when the volume of remaining fuel is reduced to a predetermined level or less, and produced in the form of an expanded chamber with one side surface thereof fitted along the inner surface of said top and with the outside surface thereof joined to said top; and said expanded chamber for fixedly attaching said casing, to which said gas flow channel is connected, to the inner surface of said top, and the inner end of said valve being fitted to the end of said gas flow channel when said lid is attached to said top after said top is joined to said container body.

16. A cassette gas cylinder as defined in claim 15, wherein said remaining volume alarm unit is provided with a movable vibrating member for producing a collision sound when vibrated and caused to collide with a body by the burst of gas; and a damping means connected to said vibrating member by means of a coupling member, and located below said predetermined level of the liquefied fuel gas, whereby said damping means suppresses the production of a collision sound made by said vibrating member by providing said vibrating member with resistance when the level of the liquefied fuel is above said predetermined level, but does not suppress the production of the collision sound when the level of the liquefied fuel is below said predetermined level.

17. A method for manufacturing a cassette type gas cylinder provided with a container for containing liquefied fuel gas, which is made up of a cylindrical container body, an annular top to be joined to one end of said container body and a lid to be joined to the center aperture of said top, and a valve fixed to the center of said lid for controlling the discharge of the liquefied fuel gas, said method comprising the steps of:

disposing a gas flow channel with one end thereof insertably fitted into the inner end of said valve in the axial direction and with the other end thereof extended upward into a gas space formed above the fuel level of said container body laid horizontally;

disposing a casing which is connected to the end of said gas flow channel for housing a remaining volume alarm unit which gives an alarm when the volume of remaining fuel is reduced to a predetermined level or less, and also produced in the form of an expanded chamber with one side surface thereof fitted along the inner surface of said top and with the outside surface thereof joined to said top;

fixing said casing to which said gas flow channel is connected to the inner surface of said top; and assembling said gas cylinder by fitting the end of said valve to the end of said gas flow channel when said lid is attached to said top after said top and said container body are joined together.

18. A cassette gas cylinder comprising:

a cylindrical container body for containing liquefied fuel;

a lid for sealing an open end of said cylindrical container body;

a valve fixedly attached to the center of said lid for controlling the discharge of said liquefied fuel;

a housing, having a built-in remaining volume alarm unit, with one end thereof formed into a gas chamber which is connected with a gas space above the fuel level of said container body when said cylinder is laid horizontally, and also having a gas flow channel with one end thereof insertably fitted into the inner end of said valve in the axial direction and with the other end thereof connected to said gas chamber;

a cylinder section formed inside said gas chamber which vertically extends when said cylinder is laid horizontally;

a hammer means housed in said cylinder section for producing a collision sound when moved by the burst of gas contained in said container body, and the upper surface of said hammer means being subjected to a pressure of said gas chamber and the lower surface of said hammer means being subjected to an internal pressure of said container body;

a resilient member interposed between the bottom surface of said hammer and said cylinder;

an inflow passage formed along said cylinder for connecting said gas chamber with said container body when said hammer is lowered compressing said resilient member by a given amount;

an outflow channel formed along said cylinder for connecting said gas chamber with said container body when said hammer is elevated by a given amount or more;

a coupling member with one end thereof fixed to the bottom of said hammer and with the other end thereof extended downwardly along a guide section which vertically stretches from the bottom of said gas chamber and is attached to a piston-shaped damping body;

said piston-shaped damping body movable with said hammer for detecting the level of fuel fixedly attached to the lower end of said coupling member, and located below a predetermined level of the liquefied fuel gas; and said guide section enabling the influx of liquefied fuel gas contained in said container, and a part of said guide section along which said damping body slides having a diameter slightly larger than the outer diameter of said damping body, whereby said damping means suppresses the production of a collision sound made by said vibrating member by providing said vibrating member with resistance when the level of the liquefied fuel is above said predetermined level, but does not suppress the production of the collision sound when the level of the liquefied fuel is below said predetermined level.

19. A cassette type gas cylinder as defined in claim 18, wherein the length of said housing is approximately equivalent to the diameter of said container body, and engaging portions formed on both ends of said housing engage with holding sections formed on said container body, thereby fixedly positioning said housing in said container.

20. A cassette type gas cylinder as defined in claim 18, wherein the bottom surface of said gas chamber of said housing is in the shape of a rectangle.

21. A cassette type gas cylinder as defined in claim 20, wherein said gas chamber of said housing is made up of a casing vessel joined with a casing bottom; the bottom shape of said gas chamber is formed into a rectangle with unequal adjacent sides; and said housing is provided with a directionality when said casing vessel and said casing bottom are joined together.

22. A cassette type gas cylinder as defined in claim 20, wherein two sets of engaging sections are symmetrically arranged on the outer surface of said casing vessel of said housing so that said engaging sections can engage with said holding sections of said container body irrespective of directions in which said casing vessel is mounted.

23. A cassette type gas cylinder as defined in claim 18, wherein said gas flow channel and said guide section for level detection are integrated together.

24. A cassette type gas cylinder as defined in claim 18, wherein an O-ring is attached to the outer periphery of an insert section of the inner end of said valve, and the inner surface of a receiving section at the end of said gas flow channel is tapered.

25. A cassette type gas cylinder as defined in claim 18, wherein said housing is fixed to said container body by means of a wire-shaped spring member.

26. A cassette type gas cylinder as defined in claim 18, wherein said resilient member is made of urethane rubber and also formed into a ring.

27. A cassette type gas cylinder as defined in claim 18, wherein said outflow and inflow channels are axially formed over the inner periphery of said cylinder.

28. A remaining volume alarm unit for use with a cassette type gas cylinder containing liquefied fuel gas, said alarm unit comprising:

a gas flow channel means with one end thereof connected to the inner end of a valve of said cylinder and with the other end thereof opened into a gas space formed above the level of the fuel when said gas cylinder is laid horizontally;

a movable vibrating member disposed in said gas flow channel means for producing a sound when vibrated and caused to collide with a body by the burst of the fuel gas; and a damping means connected to said vibrating member by means of a coupling member, and located below a predetermined level of the liquefied fuel gas, whereby said damping means suppresses the production of a collision sound made by said vibrating member by providing the vibrating member with resistance when the level of the liquefied fuel is above said predetermined level, but does not suppress the production of the collision sound when the level of the liquefied fuel is below said predetermined level.

29. A cassette type gas cylinder as defined in claim 28, further comprising:

a casing connected to said gas flow channel means; and a cylinder having a connecting hole arranged inside said casing, in which said vibrating member is slidably fitted in said cylinder with one end surface of said vibrating member being subjected to an internal gas pressure of said container;

said connecting hole formed so as to be closed by said vibrating member when said vibrating member is situated at a descended position, whereby the movement of said vibrating member is brought about by the increase of a difference between pressures acting on both sides of said vibrating member when said connecting hole is closed in response to a pressure drop occurring in said gas flow channel means resulting from the opening of said valve, and the speed of movement of said vibrating member depends on the position of said damping means with respect to said predetermined level.

30. A cassette type gas cylinder as defined in claim 29, wherein said vibrating means is in the form of a piston.

31. A cassette type gas cylinder as defined in claim 28, further comprising:

a resilient member for supporting the weight of said vibrating member when said gas flow channel means is disconnected from an internal space of said cylinder by said vibrating member; and a port which opens when said vibrating member is moved displacing said resilient member, and then said gas flow channel means is connected with the internal space of said cylinder.

* * * * *